(12) United States Patent
Le Leannec et al.

(10) Patent No.: US 12,395,637 B2
(45) Date of Patent: Aug. 19, 2025

(54) SPATIAL ILLUMINATION COMPENSATION ON LARGE AREAS

(71) Applicant: InterDigital Madison Patent Holdings, SAS, Paris (FR)

(72) Inventors: Fabrice Le Leannec, Betton (FR); Ya Chen, Rennes (FR); Gaëlle Martin-Cocher, Toronto (CA)

(73) Assignee: InterDigital Madison Patent Holdings, SAS, Paris (FR)

( * ) Notice: Subject to any disclaimer, the term of this patent is extended or adjusted under 35 U.S.C. 154(b) by 127 days.

(21) Appl. No.: 18/285,939

(22) PCT Filed: Mar. 29, 2022

(86) PCT No.: PCT/EP2022/058313
§ 371 (c)(1),
(2) Date: Oct. 6, 2023

(87) PCT Pub. No.: WO2022/214362
PCT Pub. Date: Oct. 13, 2022

(65) Prior Publication Data
US 2024/0205412 A1    Jun. 20, 2024

(30) Foreign Application Priority Data
Apr. 9, 2021    (EP) .................................... 21305474

(51) Int. Cl.
*H04N 19/136*    (2014.01)
*H04N 19/11*    (2014.01)
(Continued)

(52) U.S. Cl.
CPC ........... *H04N 19/136* (2014.11); *H04N 19/11* (2014.11); *H04N 19/119* (2014.11);
(Continued)

(58) Field of Classification Search
CPC .. H04N 19/172; H04N 19/593; H04N 19/136; H04N 19/503; H04N 19/167; H04N 19/147; H04N 19/11; H04N 19/119
See application file for complete search history.

(56) References Cited

U.S. PATENT DOCUMENTS

2011/0170606 A1    7/2011    Zhang et al.
2012/0243608 A1    9/2012    Yu et al.
(Continued)

OTHER PUBLICATIONS

Andersson, Kenneth, "Combined Intra Inter Prediction Coding Mode", International Telecommunication Union (ITU), Telecommunications Standardization Sector, Video Coding Experts Group (VCEG), Document: VCEG-AD11, 30th Meeting, Hangzhou, China, Oct. 20, 2006, 5 pages.

(Continued)

*Primary Examiner* — Tsion B Owens
(74) *Attorney, Agent, or Firm* — Condo Roccia Koptiw LLP

(57) ABSTRACT

A reconstruction method comprising: obtaining (811) a region predictor for a current region of a picture based on a spatial prediction; obtaining (812) an information representative of a partitioning of the current region into sub-regions; reconstructing (813) at least one residual sub-region based on an intra prediction residual and an intra prediction mode and obtaining a reconstructed residual region from the at least one reconstructed residual sub-region, wherein all reference samples external to the current region used for reconstructing the at least one sub-region are set to zero before reconstructing the at least one residual sub-region; and, reconstructing (814) the current region based on the reconstructed residual region and on the region predictor by adding a final predictor obtained from the region predictor and the reconstructed residual region.

20 Claims, 16 Drawing Sheets

(51) Int. Cl.
   *H04N 19/119*   (2014.01)
   *H04N 19/167*   (2014.01)
   *H04N 19/172*   (2014.01)
   *H04N 19/503*   (2014.01)
   *H04N 19/593*   (2014.01)

(52) U.S. Cl.
   CPC ......... *H04N 19/167* (2014.11); *H04N 19/172* (2014.11); *H04N 19/503* (2014.11); *H04N 19/593* (2014.11)

(56) References Cited

U.S. PATENT DOCUMENTS

| | | | | |
|---|---|---|---|---|
| 2019/0268599 | A1* | 8/2019 | Hannuksela | G03B 37/00 |
| 2020/0162728 | A1* | 5/2020 | Van der Auwera | H04N 19/105 |
| 2021/0266581 | A1* | 8/2021 | Jung | H04N 19/70 |
| 2022/0014741 | A1* | 1/2022 | Xiu | H04N 19/70 |
| 2023/0061216 | A1* | 3/2023 | Zhao | H04N 19/57 |
| 2024/0205412 | A1* | 6/2024 | Le Leannec | H04N 19/172 |
| 2024/0406375 | A1* | 12/2024 | Lim | H04N 19/593 |

OTHER PUBLICATIONS

"Test Model 11 for Versatile Video Coding (VTM 11)", International Organization for Standardization (ISO) and International Electrotechnical Commission (IEC), MPEG Joint Video Coding Team(s) with ITU-T SG 16, ISO/IEC JTC 1/SC 29/WG 4 N0023, Oct. 16, 2020, 102 pages.

Chen et al., "Scalable Video Coding Extension for HEVC", Institute of Electrical and Electronics Engineers (IEEE), 2013 Data Compression Conference, Snowbird, Utah, USA, Mar. 20, 2013, 10 pages.

Bross et al., "Versatile video coding (draft 9)", Joint Video Experts Team (JVET) of ITU-T SG 16 WP 3 and ISO/IEC ITC 1/SC 29/WG 11, Document: JVET-R2001-vA, 18th Meeting, by teleconference, Apr. 15, 2020, 524 pages.

Lou, Chung-Cheng, "Low complexity and high efficiency prediction techniques for video coding", University of Southern California, Faculty of the USC Graduate School, Dissertation Paper, Dec. 2011, 124 pages.

Jin et al., "Combined Inter-Intra Prediction for High Definition Video Coding", Picture Coding Symposium 2007, Lisboa, Portugal, Nov. 7, 2007, 4 pages.

Hinz et al., "An HEVC Extension for Spatial and Quality Scalable Video Coding", The International Society for Optics and Photonics (SPIE), IS&T/SPIE Electronic Imaging, Proceedings vol. 8666, Visual Information Processing and Communication IV, Burlingame, California, USA, Feb. 21, 2013, 16 pages.

\* cited by examiner

SPATIAL ILLUMINATION COMPENSATION ON LARGE AREAS

CROSS REFERENCE TO RELATED APPLICATIONS

This application is a U.S. National Stage Application under 35 U.S.C. § 371 of International Patent Application No. PCT/EP2022/058313, filed Mar. 29, 2022, which is incorporated herein by reference in its entirety.

This application claims priority to European Application No. 21305474.5, filed Apr. 9, 2021, which is incorporated herein by reference in its entirety.

1. TECHNICAL FIELD

At least one of the present embodiments generally relates to a method and an apparatus for encoding or decoding large areas in pictures using a prediction mode based on spatial illumination compensation.

2. BACKGROUND

To achieve high compression efficiency, video coding schemes usually employ predictions and transforms to leverage spatial and temporal redundancies in a video content. During an encoding, pictures of the video content are divided into blocks of samples (i.e. Pixels), these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original sub-block. Then, a sub-block representing a difference between the original sub-block and the predictor sub-block, often denoted as a prediction error sub-block, a prediction residual sub-block or simply a residual block, is transformed, quantized and entropy coded to generate an encoded video stream. To reconstruct the video, the compressed data is decoded by inverse processes corresponding to the transform, quantization and entropic coding.

First video compression methods, such as MPEG-1 (ISO/CEI-11172), MPEG-2 (ISO/CEI 13818-2) or MPEG-4/AVC (ISO/CEI 14496-10), were mainly designed to handle natural contents such as pictures acquired by a camera. Pictures contents to encode are now either natural contents, a mix of natural and synthetic contents and fully synthetic contents. Synthetic contents such as pictures from video games, virtual reality contents, may have characteristics that one never or rarely meets in natural contents. For instance, synthetic video contents may contain some gradual illumination variations inside some pictures. In such case a block to encode may contain some background content with gradually evolving luma values according to a spatial location, and some local specific texture elements that may be considered as foreground information. Existing tools are not able to properly handle large image areas that mix some spatial smooth luma/chroma variations and particular local objects/textures. This was not an issue for first video compression methods but the situation is different for video compression under development, such as for example the international standard entitled Versatile Video Coding (VVC) under development by a joint collaborative team of ITU-T and ISO/IEC experts known as the Joint Video Experts Team (JVET) or in the standard HEVC (ISO/IEC 23008-2-MPEG-H Part 2, High Efficiency Video Coding/ITU-T H.265)), or for future video compression methods, since these methods will have to handle synthetic contents.

It is desirable to propose solutions allowing to overcome the above issues. In particular, it is desirable to propose encoding tools allowing to handle efficiently synthetic contents comprising gradually evolving luma/chroma values according to a spatial location, and some local specific texture elements that may be considered as foreground information.

3. BRIEF SUMMARY

In a first aspect, one or more of the present embodiments provide a reconstruction method comprising: obtaining a region predictor for a current region of a picture based on a spatial prediction: obtaining an information representative of a partitioning of the current region into sub-regions: reconstructing at least one residual sub-region based on an intra prediction residual and an intra prediction mode and obtaining a reconstructed residual region from the at least one reconstructed residual sub-region, wherein all reference samples external to the current region used for reconstructing the at least one sub-region are set to zero before reconstructing the at least one residual sub-region: and, reconstructing the current region based on the reconstructed residual region and on the region predictor by adding a final predictor obtained from the region predictor and the reconstructed residual region.

In an embodiment, the method comprises obtaining an information representative of a prediction mode applied to obtain the region predictor.

In an embodiment, the region is: a coding tree unit; or, a block of a predefined fixed size; or, a block of a size larger than a predefined fixed size: or, a region having a depth value in a coding tree unit lower than a predefined value.

In an embodiment, the region predictor is obtained from a plurality of linear predictions, each linear prediction being based on parameters representative of illumination variations in the picture obtained from at least one region of the picture spatially neighboring the current region.

In an embodiment, the region predictor is obtained based on a combination of an horizontal linear prediction and a vertical linear prediction, each linear prediction using samples of reconstructed regions neighboring the current region and at least one sample belonging to a non-reconstructed region.

In an embodiment, the sample belonging to a non-reconstructed region is a bottom right sample of the current region in the current region or out of the current region.

In an embodiment, the method comprises obtaining a temporal predictor for the current region and the final predictor is a weighted average of the region predictor and the temporal predictor.

In an embodiment, the reconstructed residual region undergoes an inverse reshaping process before being used for reconstructing the current region.

In a second aspect, one or more of the present embodiments provide a method for decoding a current region of a picture comprising parsing in a bitstream a syntax element signaling at a level of the current region or at a level of a sub-region of the current region a use of the reconstruction method according to the first aspect for reconstructing the current region.

In an embodiment, an information representative of the sample belonging to a non-reconstructed region is obtained from the bitstream.

In a third aspect, one or more of the present embodiments provide a prediction method comprising: obtaining a region predictor for a current region of an picture; obtaining a residual region for the current region by subtracting a final predictor obtained from the region predictor from the current region; partitioning the residual region into residual sub-regions; and, intra predicting at least one residual sub-region, wherein all reference samples external to the region used for intra predicting at least one sample of the residual region are set to zero before intra predicting the at least one residual sub-region.

In an embodiment, the region is: a coding tree unit: or, a block of a predefined fixed size: or, a block of a size larger than a predefined fixed size: or, a region having a depth value in a coding tree unit lower than a predefined value.

In an embodiment, the region predictor is obtained from a plurality of linear predictions, each linear prediction being based on parameters representative of illumination variations in the picture obtained from at least one region of the picture spatially neighboring the current region.

In an embodiment, the region predictor is obtained based on a combination of an horizontal linear prediction and a vertical linear prediction, each linear prediction using samples of reconstructed regions neighboring the current region and at least one sample belonging to a non-reconstructed region.

In an embodiment, the sample belonging to a non-reconstructed region is a bottom right sample of the current region in the current region or out of the current region.

In an embodiment, the method comprises obtaining a temporal predictor for the current region and the final predictor is a weighted average of the region predictor and the temporal predictor.

In an embodiment, the residual region undergoes a reshaping process before intra prediction of the at least one residual sub-region.

In a fourth aspect, one or more of the present embodiments provide a method for encoding a current region of a picture comprising signaling in a bitstream a syntax element specifying at a level of the current region or at a level of a sub-region of the current region a use of the prediction method according to the first aspect for encoding the current region.

In an embodiment, an information representative of the sample belonging to a non-reconstructed region is signaled in the bitstream.

In an embodiment, the method comprises signaling in the bitstream an information representative of a prediction mode applied to obtain the region predictor.

In a fifth aspect, one or more of the present embodiments provide a reconstruction device for reconstructing a current region of a picture predicted using a prediction mode combining a global and a local prediction comprising electronic circuitry adapted for:
obtaining a region predictor for the current region based on a spatial prediction:
obtaining an information representative of a partitioning of the current region into sub-regions;
reconstructing at least one residual sub-region based on an intra prediction residual and an intra prediction mode and obtaining a reconstructed residual region from the at least one reconstructed residual sub-region, wherein all reference samples external to the current region used for reconstructing the at least one sub-region are set to zero before reconstructing the at least one residual sub-region: and,
reconstructing the current region based on the reconstructed residual region and on the region predictor by adding a final predictor obtained from the region predictor and the reconstructed residual region.

In an embodiment, the electronic circuitry is further adapted for obtaining an information representative of a prediction mode applied to obtain the region predictor.

In an embodiment, the region is: a coding tree unit; or, a block of a predefined fixed size: or, a block of a size larger than a predefined fixed size: or, a region having a depth value in a coding tree unit lower than a predefined value.

In an embodiment, the region predictor is obtained from a plurality of linear predictions, each linear prediction being based on parameters representative of illumination variations in the picture obtained from at least one region of the picture spatially neighboring the current region.

In an embodiment, the region predictor is obtained based on a combination of an horizontal linear prediction and a vertical linear prediction, each linear prediction using samples of reconstructed regions neighboring the current region and at least one sample belonging to a non-reconstructed region.

In an embodiment, the sample belonging to a non-reconstructed region is a bottom right sample of the current region in the current region or out of the current region.

In an embodiment, the electronic circuitry is further adapted for obtaining a temporal predictor for the current region and wherein the final predictor is a weighted average of the region predictor and the temporal predictor.

In an embodiment, the reconstructed residual region undergoes an inverse reshaping process before being used for reconstructing the current region.

In an embodiment, the electronic circuitry is further adapted for parsing in a bitstream a syntax element signaling at a level of the current region or at a level of a sub-region of the current region a use of the mode combining a global and a local prediction.

In an embodiment, an information representative of the sample belonging to a non-reconstructed region is obtained from the bitstream.

In a sixth aspect, one or more of the present embodiments provide a prediction device for predicting a current region of a picture according to a prediction mode combining a global and a local prediction comprising an electronic circuitry adapted for:
obtaining a region predictor for the current region;
obtaining a residual region for the current region by subtracting a final predictor obtained from the region predictor from the current region;
partitioning the residual region into residual sub-regions; and,
intra predicting at least one residual sub-region, wherein all reference samples external to the region used for intra predicting at least one sample of the residual region are set to zero before intra predicting the at least one residual sub-region.

In an embodiment, the region is: a coding tree unit: or, a block of a predefined fixed size: or, a block of a size larger than a predefined fixed size: or, a region having a depth value in a coding tree unit lower than a predefined value.

In an embodiment, the region predictor is obtained from a plurality of linear predictions, each linear prediction being based on parameters representative of illumination variations in the picture obtained from at least one region of the picture spatially neighboring the current region.

In an embodiment, the region predictor is obtained based on a combination of an horizontal linear prediction and a vertical linear prediction, each linear prediction using samples of reconstructed regions neighboring the current region and at least one sample belonging to a non-reconstructed region.

In an embodiment, the sample belonging to a non-reconstructed region is a bottom right sample of the current region in the current region or out of the current region.

In an embodiment, the electronic circuitry is further adapted for obtaining a temporal predictor for the current region and wherein the final predictor is a weighted average of the region predictor and the temporal predictor.

In an embodiment, the residual region undergoes a reshaping process before intra prediction of the at least one residual sub-region.

In an embodiment, the electronic circuitry is further adapted for signaling in a bitstream a syntax element specifying at a level of the current region or at a level of a sub-region of the current region a use of the prediction mode combining global and local prediction.

In an embodiment, an information representative of the sample belonging to a non-reconstructed region is signaled in the bitstream.

In an embodiment, the electronic circuitry is further adapted for signaling in the bitstream an information representative of a prediction mode applied to obtain the region predictor.

In a seventh aspect, one or more of the present embodiments provide an apparatus comprising a device according to the fifth or the sixth aspect.

In a eighth aspect, one or more of the present embodiments provide a signal generated by the method of the third or fourth aspect or by the device of sixth aspect or by the apparatus of the seventh aspect.

In a ninth aspect, one or more of the present embodiments provide a computer program comprising program code instructions for implementing the method according to one of the first four aspects.

In a tenth aspect, one or more of the present embodiments provide a non-transitory information storage medium storing program code instructions for implementing the method according to one of the first four aspects.

4. BRIEF SUMMARY OF THE DRAWINGS

FIG. 1 describes an example of a context in which embodiments can be implemented:

5. DETAILED DESCRIPTION

The following examples of embodiments are described in the context of a video format similar to VVC. However, these embodiments are not limited to the video coding/decoding method corresponding to VVC. These embodiments are in particular adapted to any video format. Such formats comprise for example the standard EVC (Essential Video Coding/MPEG-5), AV1 and VP9.

Figure 2:
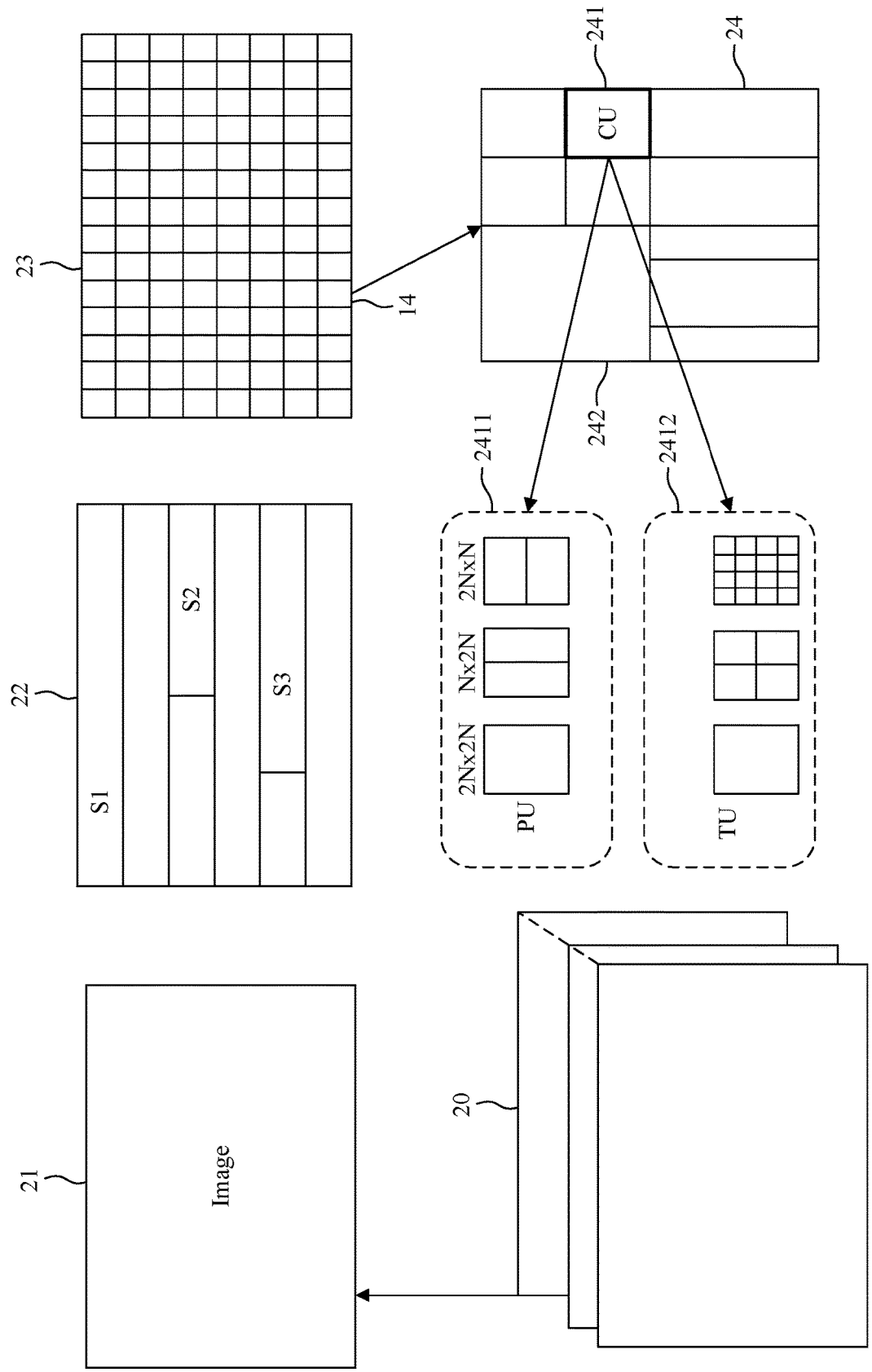
FIG. 2 illustrates schematically an example of partitioning undergone by a picture of pixels of an original video.
Figure 3:
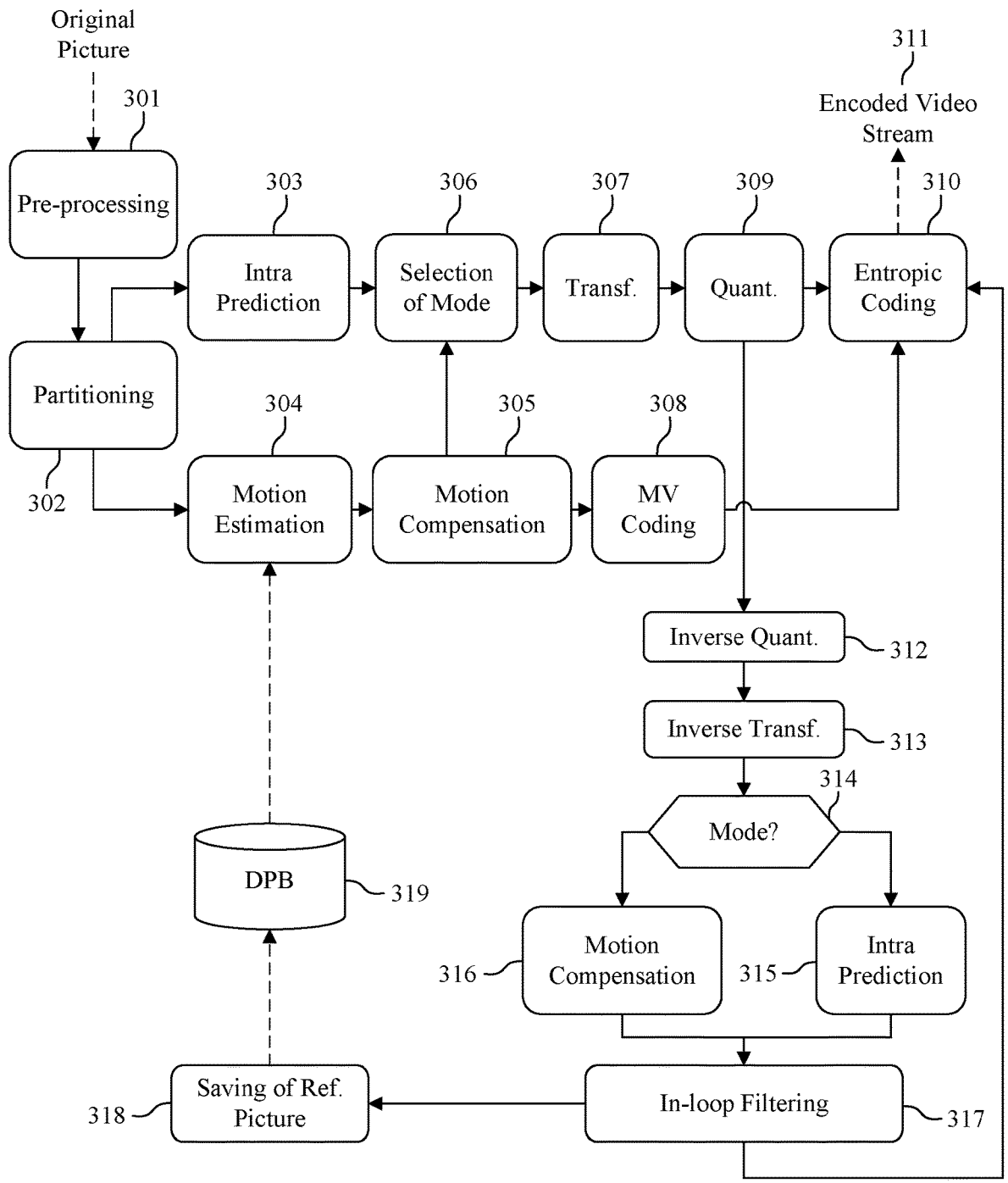
FIG. 3 depicts schematically a method for encoding a video stream.
Figure 4:
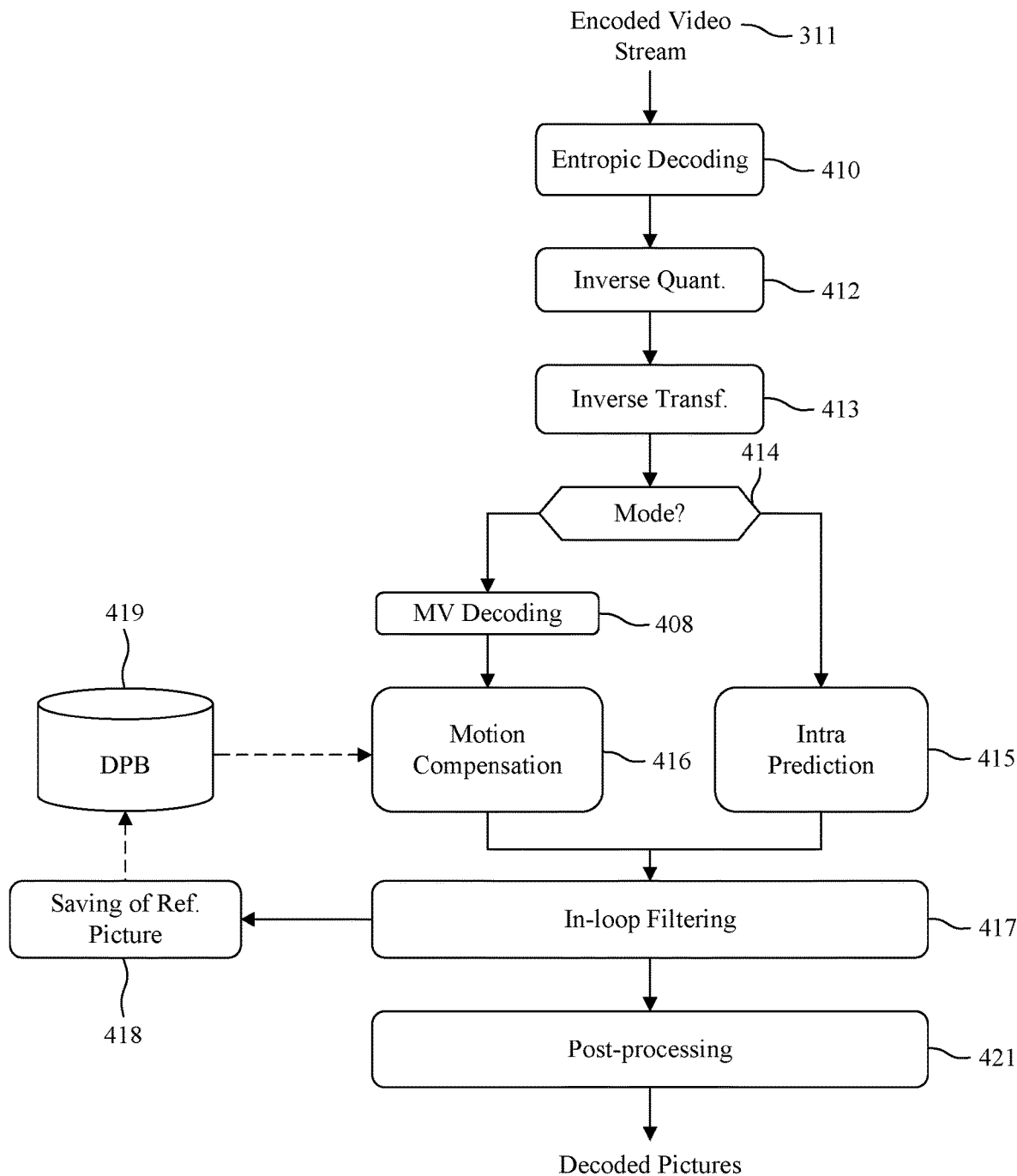
FIG. 4 depicts schematically a method for decoding an encoded video stream.

FIGS. 2, 3 and 4 introduce an example of video format.

FIG. 2 illustrates an example of partitioning undergone by a picture of pixels 21 of an original video 20. It is considered here that a pixel is composed of three components: a luminance component and two chrominance components. Other types of pixels are however possible comprising less or more components such as only a luminance component or an additional depth component.

A picture is divided into a plurality of coding entities. First, as represented by reference 23 in FIG. 2, a picture is divided in a grid of blocks called coding tree units (CTU). A CTU consists of an N×N block of luminance samples together with two corresponding blocks of chrominance samples. N is generally a power of two having a maximum value of "128" for example. Second, a picture is divided into one or more groups of CTU. For example, it can be divided into one or more tile rows and tile columns, a tile being a sequence of CTU covering a rectangular region of a picture. In some cases, a tile could be divided into one or more bricks, each of which consisting of at least one row of CTU within the tile. Above the concept of tiles and bricks, another encoding entity, called slice, exists, that can contain at least one tile of a picture or at least one brick of a tile.

In the example in FIG. 2, as represented by reference 22, the picture 21 is divided into three slices S1, S2 and S3 of the raster-scan slice mode, each comprising a plurality of tiles (not represented), each tile comprising only one brick.

As represented by reference 24 in FIG. 2, a CTU may be partitioned into the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned.

In the example of FIG. 2, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of a picture, the partitioning is adaptive, each CTU being partitioned so as to optimize a compression efficiency of the CTU criterion.

In HEVC appeared the concept of prediction unit (PU) and transform unit (TU). Indeed, in HEVC, the coding entity that is used for prediction (i.e. a PU) and transform (i.e. a TU) can be a subdivision of a CU. For example, as represented in FIG. 2, a CU of size 2N×2N, can be divided in PU 2411 of size N×2N or of size 2N×N. In addition, said CU can be divided in "4" TU 2412 of size N×N or in "16" TU of size $$\left(\frac{N}{2}\right) \times \left(\frac{N}{2}\right).$$

One can note that in VVC, except in some particular cases, frontiers of the TU and PU are aligned on the frontiers of the CU. Consequently, a CU comprises generally one TU and one PU.

In the present application, the term "block" or "picture block" can be used to refer to any one of a CTU, a CU, a PU and a TU. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "subpicture", "slice" and "frame" may be used interchangeably. Usually, but not necessarily, the term "reconstructed" is used at the encoder side while "decoded" is used at the decoder side.

FIG. 3 depicts schematically a method for encoding a video stream executed by an encoding module. Variations of this method for encoding are contemplated, but the method for encoding of FIG. 3 is described below for purposes of clarity without describing all expected variations.

Before being encoded, a current original image of an original video sequence may go through a pre-processing. For example, in a step 301, a color transform is applied to the current original picture (e.g., conversion from RGB 4:4:4 to YCbCr 4:2:0), or a remapping is applied to the current original picture components in order to get a signal distribution more resilient to compression (for instance using a histogram equalization of one of the color components).

The encoding of the pre-processed pictures begins with a partitioning of the pre-processed picture during a step 302, as described in relation to FIG. 2. The pre-processed picture is thus partitioned into CTU, CU, PU, TU, etc. For each block, the encoding module determines a coding mode between an intra prediction and an inter prediction.

The intra prediction consists of predicting, in accordance with an intra prediction method, during a step 303, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

Some intra prediction modes generate smooth, low frequency predicted blocks, which are adapted to predict a block that may contain some smooth spatial sample variations. These intra prediction modes are the DC and planar intra prediction modes.

The DC prediction mode produces a predicted block which has a constant luma or chroma value. This value is equal to an average of reconstructed samples located around (top and left) the current block and is used for intra prediction of this block.

Figure 6:
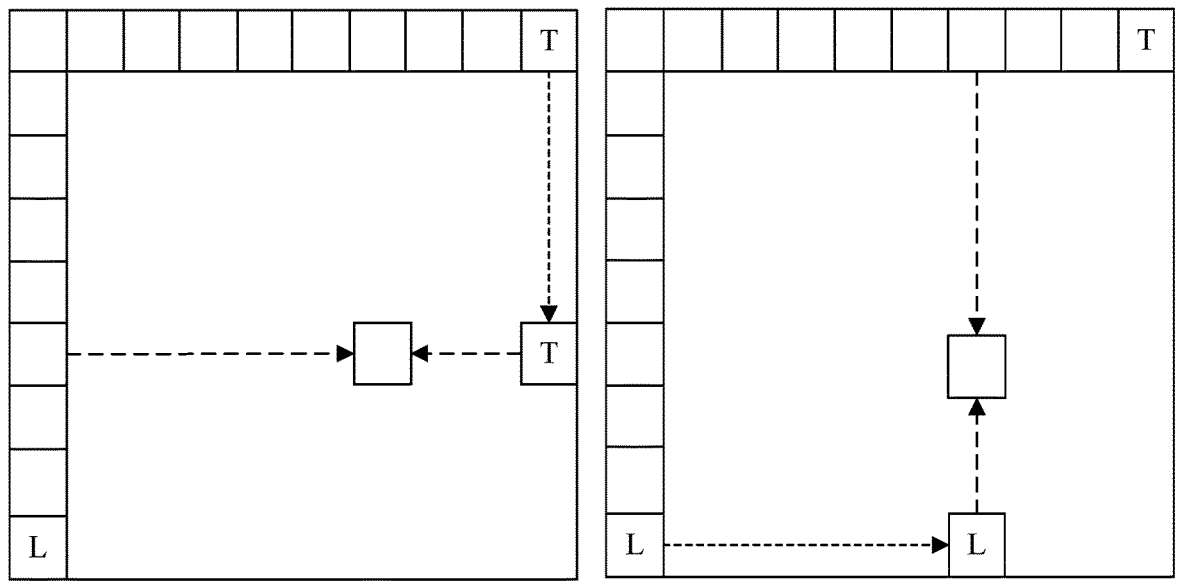
FIG. 6 depicts schematically a planar mode.

The planar mode consists in a smooth prediction, able to preserve continuities along block boundaries. It is essentially defined as an average of two linear predictions (see FIG. 6 for a graphical representation of the planar mode). A first, horizontal, linear prediction consists in a weighted average between a left-side reference and a right-side reference sample value, equal to a top-right reference sample T of the considered block. This corresponds to the left part of FIG. 6. A second, vertical, linear prediction, shown on the right of FIG. 6, is a weighted average between a top reference sample and a bottom reference sample value equal to a bottom left reference sample L of the block. The final planar prediction of current block is equal to an average of the horizontal and vertical linear predictions.

The intra prediction process summarized above is called the regular intra prediction process in the following:

The inter prediction consists of predicting the pixels of a current block from a block of pixels, referred to as the reference block, of a picture preceding or following the current picture, this picture being referred to as the reference picture. During the coding of a current block in accordance with the inter prediction method, a block of the reference picture closest, in accordance with a similarity criterion, to the current block is determined by a motion estimation step 304. During step 304, a motion vector indicating the position of the reference block in the reference picture is determined. The motion vector determined by the motion estimation is used during a motion compensation step 305 during which a residual block is calculated in the form of a difference between the current block and the reference block. In first video compression standards, the mono-directional inter prediction mode described above was the only inter mode available. As video compression standards evolve, the family of inter modes has grown significantly and comprises now many different inter modes. These inter prediction modes comprises for example the CIIP (Combined inter and intra prediction) mode which combines an inter prediction signal with an intra prediction signal, weighted prediction and Local illumination compensation (LIC). Weighted prediction applies a global illumination change on a reference picture to compensate for the illumination change that may exist between a reference picture and a temporally predicted picture. The same, linear, illumination change model is applied on the whole picture. With LIC (Local illumination change), the illumination change between a current bloc and its reference block is estimated based on a template region around (top and left) the current block and the corresponding template region around its reference block.

The inter prediction process described above is called the regular inter prediction process in the following.

During a selection step 306, the prediction mode optimising the compression performances, in accordance with a rate/distortion optimization criterion (i.e. RDO criterion), among the prediction modes tested (Intra prediction modes, Inter prediction modes), is selected by the encoding module.

When the prediction mode is selected, the residual block is transformed during a step 307 and quantized during a step 309.

Note that the encoding module can skip the transform and apply quantization directly to the non-transformed residual signal. When the current block is coded according to an intra prediction mode, a prediction direction and the transformed and quantized residual block are encoded by an entropic encoder during a step 310. When the current block is encoded according to an inter prediction, when appropriate, a motion vector of the block is predicted from a prediction vector selected from a set of motion vectors corresponding to reconstructed blocks situated in the vicinity of the block to be coded. The motion information is next encoded by the entropic encoder during step 310 in the form of a motion residual and an index for identifying the prediction vector. The transformed and quantized residual block is encoded by the entropic encoder during step 310. Note that the encoding module can bypass both transform and quantization, i.e., the entropic encoding is applied on the residual without the application of the transform or quantization processes. The result of the entropic encoding is inserted in an encoded video stream 311.

After the quantization step 309, the current block is reconstructed so that the pixels corresponding to that block can be used for future predictions. This reconstruction phase is also referred to as a prediction loop. An inverse quantization is therefore applied to the transformed and quantized residual block during a step 312 and an inverse transformation is applied during a step 313. According to the prediction mode used for the block obtained during a step 314, the prediction block of the block is reconstructed. If the current block is encoded according to an inter prediction mode, the encoding module applies, when appropriate, during a step 316, a motion compensation using the motion vector of the current block in order to identify the reference block of the current block. If the current block is encoded according to an intra prediction mode, during a step 315, the prediction direction corresponding to the current block is used for reconstructing the reference block of the current block. The reference block and the reconstructed residual block are added in order to obtain the reconstructed current block.

Following the reconstruction, an in-loop filtering intended to reduce the encoding artefacts is applied, during a step 317, to the reconstructed block. This filtering is called in-loop filtering since this filtering occurs in the prediction loop to obtain at the decoder the same reference images as the encoder and thus avoid a drift between the encoding and the decoding processes. As mentioned earlier, in-loop filtering tools comprises for example deblocking filtering, SAO (Sample Adaptive Offset), ALF (Adaptive Loop Filter).

When a block is reconstructed, it is inserted during a step 318 into a reconstructed picture stored in a memory 319 of reconstructed images corresponding generally called Decoded Picture Buffer (DPB). The reconstructed images thus stored can then serve as reference images for other images to be coded.

Metadata such as SEI (supplemental enhancement information) messages can be attached to the encoded video stream 311. A SEI (Supplemental Enhancement Information) message as defined for example in standards such as AVC, HEVC or VVC is a data container associated to a video stream and comprising metadata providing information relative to the video stream.

As can be seen from the above, none of the described encoding tools are able to properly handle regions mixing spatial gradual luma/chroma variations over a large picture area and particular local objects/textures. This is the case in particular of:

the DC and the planar prediction modes. Indeed, an encoder processing a CTU belonging to such area would partitions this CTU into small blocks, and for each block, would decide either to use the planar mode for intra prediction, which will capture the smooth spatial illumination change, either to use another intra prediction mode, more efficient to code some specific local object;

The CIIP mode: The CIIP mode may be able to perform the temporal prediction of an object while the intra prediction may try to predict the smooth texture part contained in the block. However, such combined prediction, would have to be signalled for each CU, potentially leading to a significant rate cost. Moreover, the CIIP mode does not apply on intra pictures. Moreover, it does not handle illumination changes that may exist between the current picture and its reference pictures.

Weighted prediction and LIC apply for inter pictures but not for intra pictures.

FIG. 4 depicts schematically a method for decoding the encoded video stream 311 encoded according to method described in relation to FIG. 3 executed by a decoding module. Variations of this method for decoding are contemplated, but the method for decoding of FIG. 4 is described below for purposes of clarity without describing all expected variations.

The decoding is done block by block. For a current block, it starts with an entropic decoding of the current block during a step 410. Entropic decoding allows to obtain the prediction mode of the block.

If the block has been encoded according to an inter prediction mode, the entropic decoding allows to obtain, when appropriate, a prediction vector index, a motion residual and a residual block. During a step 408, a motion vector is reconstructed for the current block using the prediction vector index and the motion residual.

If the block has been encoded according to an intra prediction mode, entropic decoding allows to obtain a prediction direction and a residual block. Steps 412, 413, 414, 415, 416 and 417 implemented by the decoding module are in all respects identical respectively to steps 412, 413, 414, 415, 416 and 417 implemented by the encoding module. Decoded blocks are saved in decoded pictures and the decoded pictures are stored in a DPB 419 in a step 418. When the decoding module decodes a given picture, the pictures stored in the DPB 419 are identical to the pictures stored in the DPB 319 by the encoding module during the encoding of said given image. The decoded picture can also be outputted by the decoding module for instance to be displayed. When RPR is activated, samples of (i.e. at least a portion of) the picture used as reference pictures are resampled in step 420 to the resolution of the predicted picture. The resampling step (420) and motion compensation step (416) can be in some implementations combined in one single sample interpolation step.

The decoded image can further go through post-processing in step 421. The post-processing can comprise an inverse color transform (e.g. conversion from YCbCr 4:2:0 to RGB 4:4:4), an inverse mapping performing the inverse of the remapping process performed in the pre-processing of step 301, a post-filtering for improving the reconstructed pictures based for example on filter parameters provided in a SEI message and/or a resampling for example for adjusting the output images to display constraints.

Figure 1:
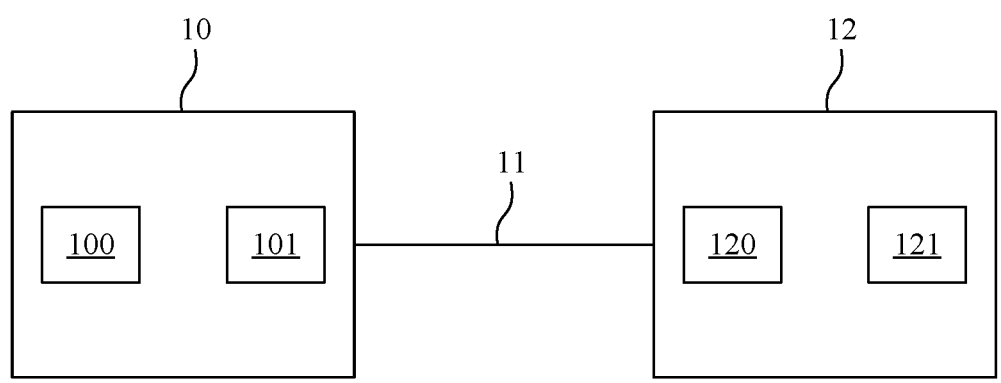

FIG. 1 describes an example of a context in which following embodiments can be implemented.

In FIG. 1, a system 10 transmits a video stream to a system 12 using a communication channel 11.

The system 10 comprises for example a game console 100 and an encoding module 101 compliant with the encoding method described in relation to FIG. 3. The game console 100 generates synthetic images and forwards these synthetic images to the encoding module 101. The encoding module 101 encodes these synthetic images in the video stream.

The system 12 comprises, for example, a decoding module 120 and a display device 121. The decoding module 120 is compliant with the decoding method described in relation to FIG. 4. The decoding module 120 decodes the video stream and forwards the decoded video stream to the display device 121.

The communication channel 11 is a wired (for example Internet or Ethernet) or a wireless (for example WiFi. 3G, 4G or 5G) network link.

Figure 5A:
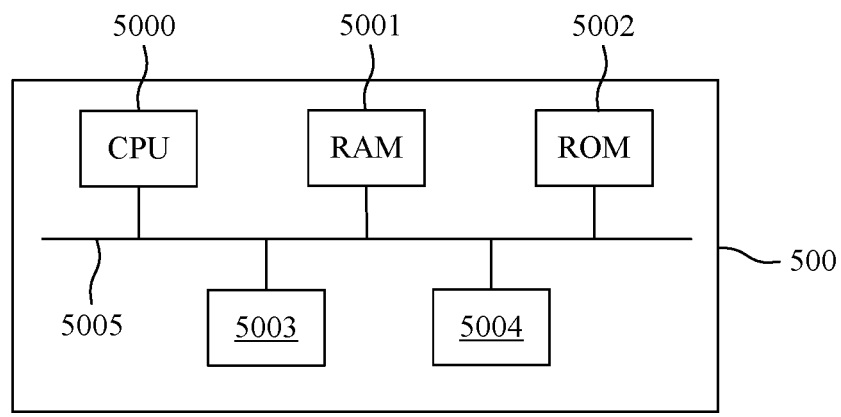
FIG. 5A illustrates schematically an example of hardware architecture of a processing module able to implement an encoding module or a decoding module in which various aspects and embodiments are implemented.

FIG. 5A illustrates schematically an example of hardware architecture of a processing module 500 able to implement the encoding module 101 or the decoding module 120 capable of implementing respectively the method for encoding of FIG. 3 and the method for decoding of FIG. 4 modified according to different aspects and embodiments described in the following. The processing module 500 comprises, connected by a communication bus 5005: a processor or CPU (central processing unit) 5000 encompassing one or more microprocessors, general purpose computers, special purpose computers, and processors based on a multi-core architecture, as non-limiting examples: a random access memory (RAM) 5001: a read only memory (ROM) 5002: a storage unit 5003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device: at least one communication interface 5004 for exchanging data with other modules, devices or equipment. The communication interface 5004 can include, but is not limited to, a transceiver configured to transmit and to receive data over a communication channel. The communication interface 5004 can include, but is not limited to, a modem or network card.

If the processing module 500 implements a decoding module, the communication interface 5004 enables for instance the processing module 500 to receive encoded video streams and to provide a sequence of decoded pictures.

If the processing module 500 implements an encoding module, the communication interface 5004 enables for instance the processing module 500 to receive a sequence of original picture data to encode (for instance provided by the game console 100) and to provide an encoded video stream.

The processor 5000 is capable of executing instructions loaded into the RAM 5001 from the ROM 5002, from an external memory (not shown), from a storage medium, or from a communication network. When the processing module 500 is powered up, the processor 5000 is capable of reading instructions from the RAM 5001 and executing them. These instructions form a computer program causing, for example, the implementation by the processor 5000 of a decoding method as described in relation with FIG. 4 or an encoding method as described in relation with FIG. 3, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 5B:
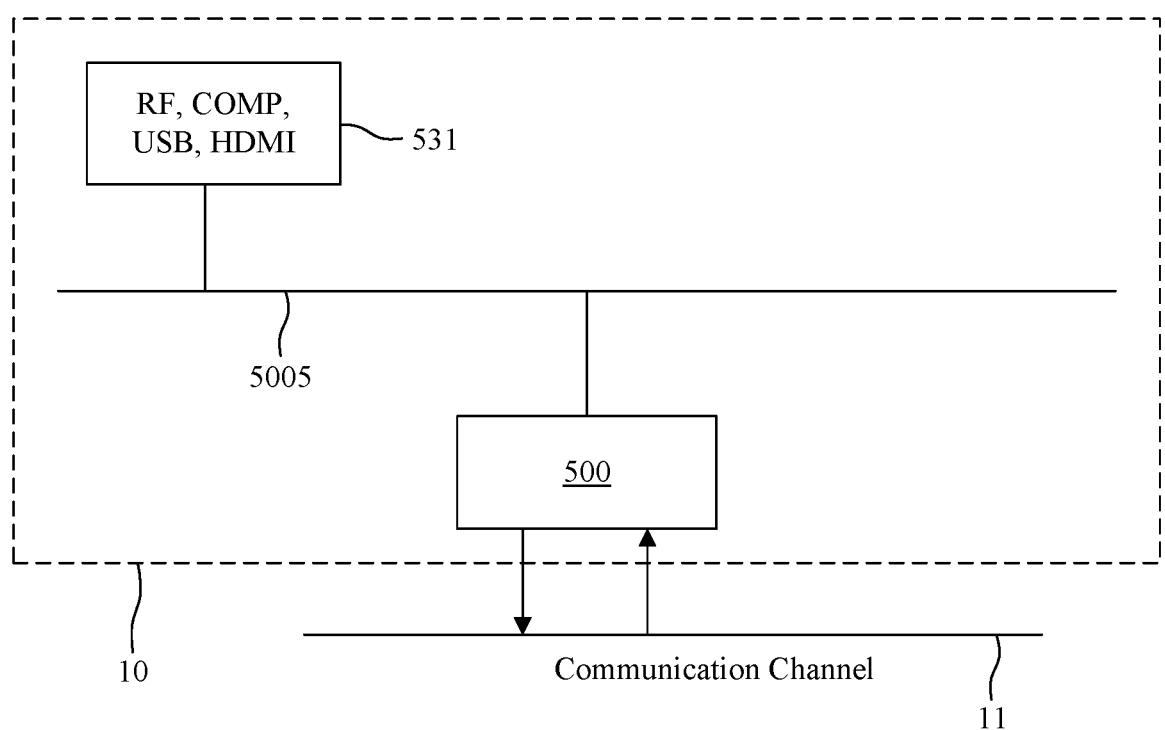
FIG. 5B illustrates a block diagram of an example of a first system in which various aspects and embodiments are implemented.
Figure 5C:
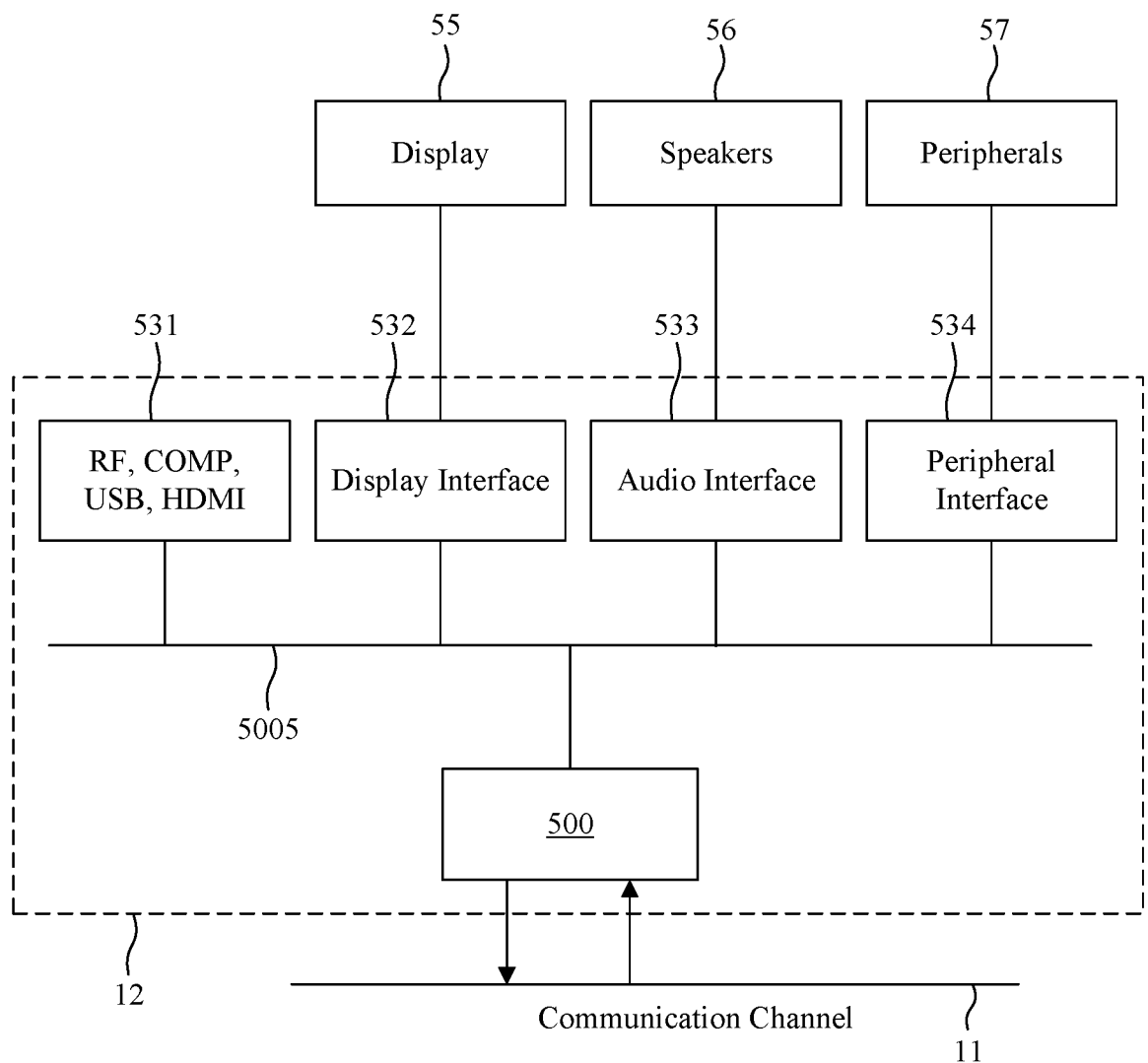
FIG. 5C illustrates a block diagram of an example of a second system in which various aspects and embodiments are implemented.

FIG. 5C illustrates a block diagram of an example of the system 12 in which various aspects and embodiments are implemented. The system 12 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances and head mounted display. Elements of system 12, singly or in combination, can be embodied in a single integrated circuit (IC), multiple ICs, and/or discrete components. For example, in at least one embodiment, the system 12 comprises one processing module 500 that implements a decoding module. In various embodiments, the system 12 is communicatively coupled to one or more other systems, or other electronic devices, via, for example, a communications bus or through dedicated input and/or output ports. In various embodiments, the system 12 is configured to implement one or more of the aspects described in this document.

The input to the processing module 500 can be provided through various input modules as indicated in block 531. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 5C, include composite video.

In various embodiments, the input modules of block 531 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 12 to other electronic devices across USB and/or HDMI connections. It is to be understood that various aspects of input processing, for example, Reed-Solomon error correction, can be implemented, for example, within a separate input processing IC or within the processing module 500 as necessary. Similarly, aspects of USB or HDMI interface processing can be implemented within separate interface ICs or within the processing module 500 as necessary. The demodulated, error corrected, and demultiplexed stream is provided to the processing module 500.

Various elements of system 12 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 12, the processing module 500 is interconnected to other elements of said system 12 by the bus 5005.

The communication interface 5004 of the processing module 500 allows the system 12 to communicate on the communication channel 11. As already mentioned above, the communication channel 11 can be implemented, for example, within a wired and/or a wireless medium.

Data is streamed, or otherwise provided, to the system 12, in various embodiments, using a wireless network such as a Wi-Fi network, for example IEEE 802.11 (IEEE refers to the Institute of Electrical and Electronics Engineers). The Wi-Fi signal of these embodiments is received over the communications channel 11 and the communications interface 5004 which are adapted for Wi-Fi communications. The communications channel 11 of these embodiments is typically connected to an access point or router that provides access to external networks including the Internet for allowing streaming applications and other over-the-top communications. Other embodiments provide streamed data to the system 12 using the RF connection of the input block 531. As indicated above, various embodiments provide data in a non-streaming manner. Additionally, various embodiments use wireless networks other than Wi-Fi, for example a cellular network or a Bluetooth network.

The system 12 can provide an output signal to various output devices, including a display system 55, speakers 56, and other peripheral devices 57. The display system 55 of various embodiments includes one or more of, for example, a touchscreen display, an organic light-emitting diode (OLED) display, a curved display, and/or a foldable display. The display 55 can be for a television, a tablet, a laptop, a cell phone (mobile phone), a head mounted display or other devices. The display system 55 can also be integrated with other components, as in FIG. 1 (for example, as in a smartphone), or separate (for example, an external monitor for a laptop). The other peripheral devices 57 include, in various examples of embodiments, one or more of a stand-alone digital video disc (or digital versatile disc) (DVR, for both terms), a disk player, a stereo system, and/or a lighting system. Various embodiments use one or more peripheral devices 57 that provide a function based on the output of the system 12. For example, a disk player performs the function of playing an output of the system 12.

In various embodiments, control signals are communicated between the system 12 and the display system 55, speakers 56, or other peripheral devices 57 using signaling such as AV.Link, Consumer Electronics Control (CEC), or other communications protocols that enable device-to-device control with or without user intervention. The output devices can be communicatively coupled to system 12 via dedicated connections through respective interfaces 532, 533, and 534. Alternatively, the output devices can be connected to system 12 using the communications channel 11 via the communications interface 5004 or a dedicated communication channel via the communication interface 5004. The display system 55 and speakers 56 can be integrated in a single unit with the other components of system 12 in an electronic device such as, for example, a television. In various embodiments, the display interface 532 includes a display driver, such as, for example, a timing controller (T Con) chip.

The display system 55 and speaker 56 can alternatively be separate from one or more of the other components. In various embodiments in which the display system 55 and speakers 56 are external components, the output signal can be provided via dedicated output connections, including, for example, HDMI ports, USB ports, or COMP outputs.

FIG. 5B illustrates a block diagram of an example of the system 10 in which various aspects and embodiments are implemented. System 10 is very similar to system 12. The system 10 can be embodied as a device including the various components described below and is configured to perform one or more of the aspects and embodiments described in this document. Examples of such devices include, but are not limited to, various electronic devices such as personal computers, laptop computers, smartphones, tablet computers, game consoles and a server. Elements of system 10, singly or in combination, can be embodied in a single integrated circuit (IC), multiple ICs, and/or discrete components. For example, in at least one embodiment, the system 10 comprises one processing module 500 that implements an encoding module. In various embodiments, the system 10 is communicatively coupled to one or more other systems, or other electronic devices, via, for example, a communications bus or through dedicated input and/or output ports. In various embodiments, the system 10 is configured to implement one or more of the aspects described in this document.

The input to the processing module 500 can be provided through various input modules as indicated in block 531 already described in relation to FIG. 5C.

Various elements of system 10 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 10, the processing module 500 is interconnected to other elements of said system 10 by the bus 5005.

The communication interface 5004 of the processing module 500 allows the system 500 to communicate on the communication channel 11.

In the embodiment of FIG. 1, the game console 100 and the encoding module 101 are embedded in the system 10. In other embodiment, the system 100 can comprise only the encoding module 100, the game console being external to the system 10. In that case, picture data generated by the game console 100 is streamed, or otherwise provided, to the system 10, in various embodiments, using a wireless network such as a Wi-Fi network, for example IEEE 802.11 (IEEE refers to the Institute of Electrical and Electronics Engineers). The Wi-Fi signal of these embodiments is received over the communications channel 11 and the communications interface 5004 which are adapted for Wi-Fi communications. The communications channel 11 of these embodiments is typically connected to an access point or router that provides access to external networks including the Internet for allowing streaming applications and other over-the-top communications. Other embodiments provide streamed data to the apparatus 10 using the RF connection of the input block 531.

As indicated above, various embodiments provide data in a non-streaming manner. Additionally, various embodiments use wireless networks other than Wi-Fi, for example a cellular network or a Bluetooth network.

The data provided are raw data provided by a picture and/or audio data generation module connected to the system 10 or comprised in the system 10 (such as the game console 100 in FIG. 1).

The system 10 can provide an output signal to various output devices capable of storing and/or decoding the output signal such as the system 12.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations described in this application, for example, for decoding a CTU encoded according to the CGLP mode.

Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy coding. In various embodiments, such processes also, or alternatively, include processes performed by an encoder of various implementations described in this application, for example, for encoding a CTU according to the CGLP mode.

Whether the phrase "encoding process" is intended to refer specifically to a subset of operations or generally to the broader encoding process will be clear based on the context of the specific descriptions and is believed to be well understood by those skilled in the art.

Note that the syntax elements names as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), smartphones, tablets, and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a use of some coding tools. In this way, in an embodiment the same parameters can be used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Figure 7:
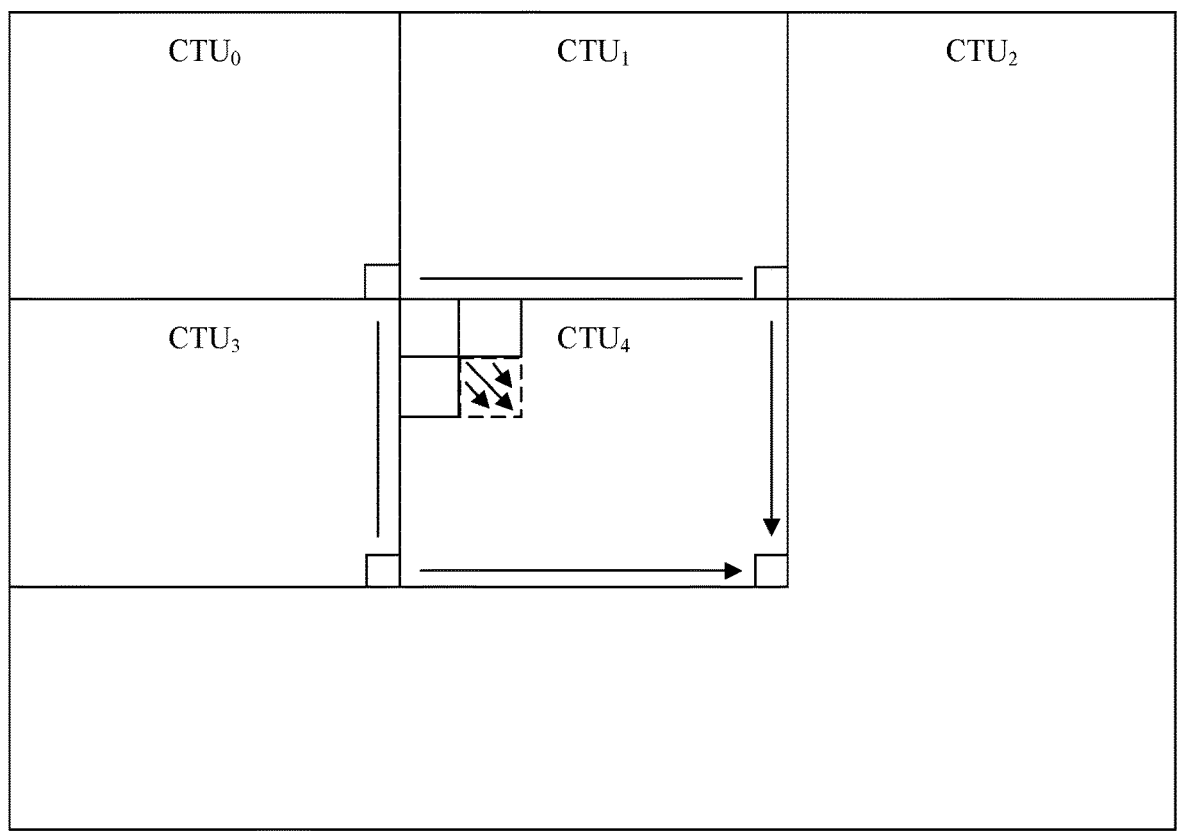
FIG. 7 illustrates a principle of a new prediction mode adapted to handle regions mixing spatial gradual luma/chroma variations over a large picture area and particular local objects/textures.

FIG. 7 illustrates a principle of a new prediction mode adapted to handle regions mixing spatial gradual luma/chroma variations over a large picture area and particular local objects/textures. As mentioned earlier in relation to FIG. 2, a picture is divided in CTUs.

For a region (i.e. a spatial area) of a picture, for example for a CTU, the two following stages are applied for the encoding of the considered region:

First, a long-distance intra prediction mode is used to catch the global illumination change at the level of the considered region (noted org_CTU when the region is a CTU). For example, a planar prediction of the considered region is performed, leading to a predictor area (noted planar_CTU when the region is a CTU and the prediction is planar).

Then, a residual region (noted res_CTU when the region is a CTU) is computed, the residual region corresponding to a difference between the original region and the predictor area (res_CTU=org_CTU−planar_CTU).

Next, the residual region (res_CTU) is encoded. To do so, the residual region is partitioned into coding units (CUs). For each CU to code, a classical intra prediction (for short distance prediction) is applied at the CU level. The resulting residual signal is coded through classical transform, quantization and entropy coding.

In the following the new prediction mode is called the combined global local prediction (CGLP) mode.

Figure 8A:
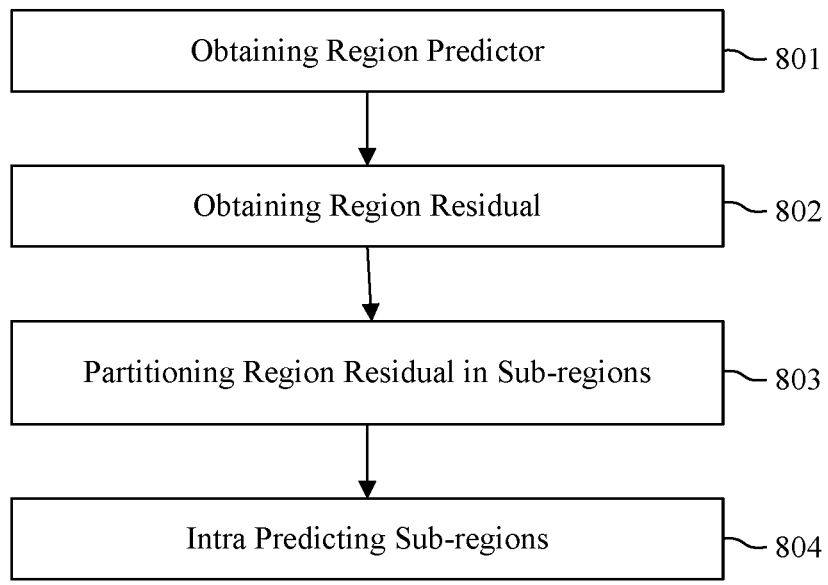
FIG. 8A represents an example of a high level process for predicting a current region of a picture according to the combined global local prediction (CGLP) mode.

FIG. 8A represents an example of a high-level process for predicting a current region of a picture according to the combined global local prediction (CGLP) mode.

The process of FIG. 8A is executed for example by the processing module 500 when the processing module 500 implements the encoding module 101. The region (i.e. the spatial area) is for example a CTU.

In a step 801, the processing module 500 obtains a region predictor for the current region based on a spatial prediction. The region predictor is for example obtained by applying a DC prediction, a planar prediction or a specific region predictor dedicated to the CGLP mode. For example, the specific region predictor could be obtained by applying only the horizontal (respectively only the vertical) interpolation process of FIG. 6.

In a step 802, the processing module 500 obtains a residual region for the current region by subtracting the region predictor from the current region.

In steps 803 and 804, the processing module 500 applies regular intra prediction process to the residual region. This is done by setting to zero all reference samples external to the region (typically samples on top and left of the region) used for intra prediction of at least one sample of the residual region before any intra prediction.

In an embodiment, values of reference samples external to the region (typically samples on top and left of the region) used for intra prediction of at least one sample of the residual region are set to a predefined value before any intra prediction. For example, the predefined value is "128".

In an embodiment, values of reference samples external to the region (typically samples on top and left of the region) used for intra prediction of at least one sample of the residual region are set to a value depending on the values of samples inside the region before any intra prediction. For example, the reference sample are set to a value corresponding to an average or a median of the values of samples inside the region. In this embodiment, this value is written in the encoded video stream 311.

In the step 803, the processing module 500 partitions the residual region in residual sub-regions.

In a step 804, the processing module 500 applies an intra prediction to at least one residual sub-region. The intra prediction comprises determining an intra prediction mode for the at least one residual sub-region, determining an intra predictor for the residual sub-region using the determined intra prediction mode and determining an intra residual for the residual sub-region as the difference between the residual sub-region and the intra predictor.

The partitioning of the residual region in residual sub-regions and the determination of the intra prediction mode is generally performed jointly based on a rate distortion optimization.

Figure 8B:
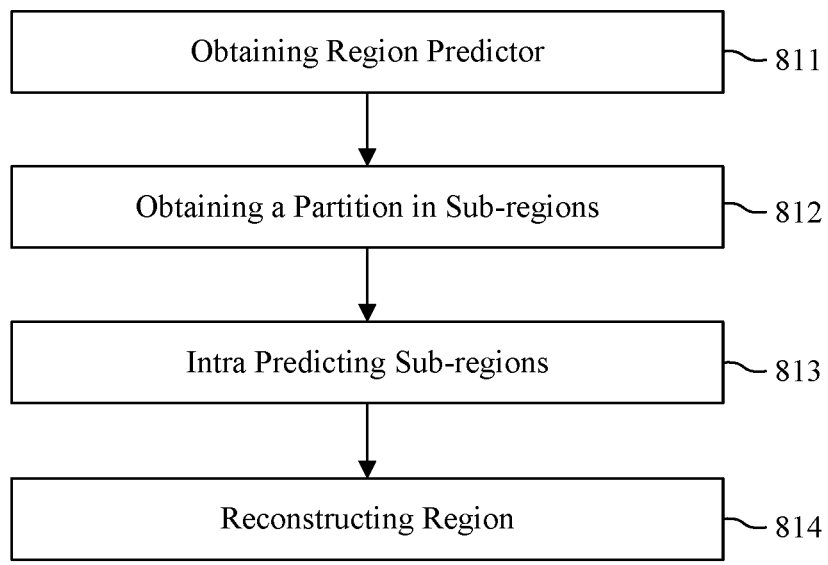
FIG. 8B represents an example of a high level process for reconstructing a current region of a picture according to the combined global local prediction (CGLP) mode.

FIG. 8B represents an example of a high level process for reconstructing a current region of a picture according to the combined global local prediction (CGLP) mode.

The process of FIG. 8B is executed for example by the processing module 500 when the processing module 500 implements the decoding module 120 or by the processing module 500 when the processing module 500 implements the encoding module 101.

In a step 811, the processing module 500 obtains a region predictor for the current region based on a spatial prediction.

In a step 812, the processing module 500 obtains an information representative of a partitioning of the current region into sub-regions.

In a step 813, the processing module 500 reconstructs at least one residual sub-region based on an intra prediction residual and an intra prediction mode. Similarly to the encoding process of FIG. 8A, all reference samples external to the current region used for reconstructing the at least one sub-region (on top and left of the current region) are set to zero before reconstructing the residual sub-regions.

In an embodiment, similarly to an embodiment of the encoding process of FIG. 8A, values of reference samples external to the region (typically samples on top and left of the region) used for intra prediction of at least one sample of the residual region are set to a predefined value before any intra prediction. For example, the predefined value is "128".

In another embodiment, the predefined value is read from the encoded video stream 311.

Steps 812 and 813 represents a regular intra prediction reconstruction process at the CU level, as described in relation to FIGS. 3 and 4, but applied to a residual sub-region of a residual region. Steps 812 and 813 allows obtaining a reconstructed residual region from the residual sub-regions.

In a step 814, the processing module 500 reconstructs the region based on the reconstructed residual region and the region predictor by adding to the region predictor and the reconstructed residual region.

Note that in the processes of FIGS. 8A and 8B, only residual sub-regions comprising at least one non-zero residual sample are intra predicted. Sub-regions comprising only residual samples equal to zero correspond to sub-regions perfectly predicted by the region predictor.

Figure 9A:
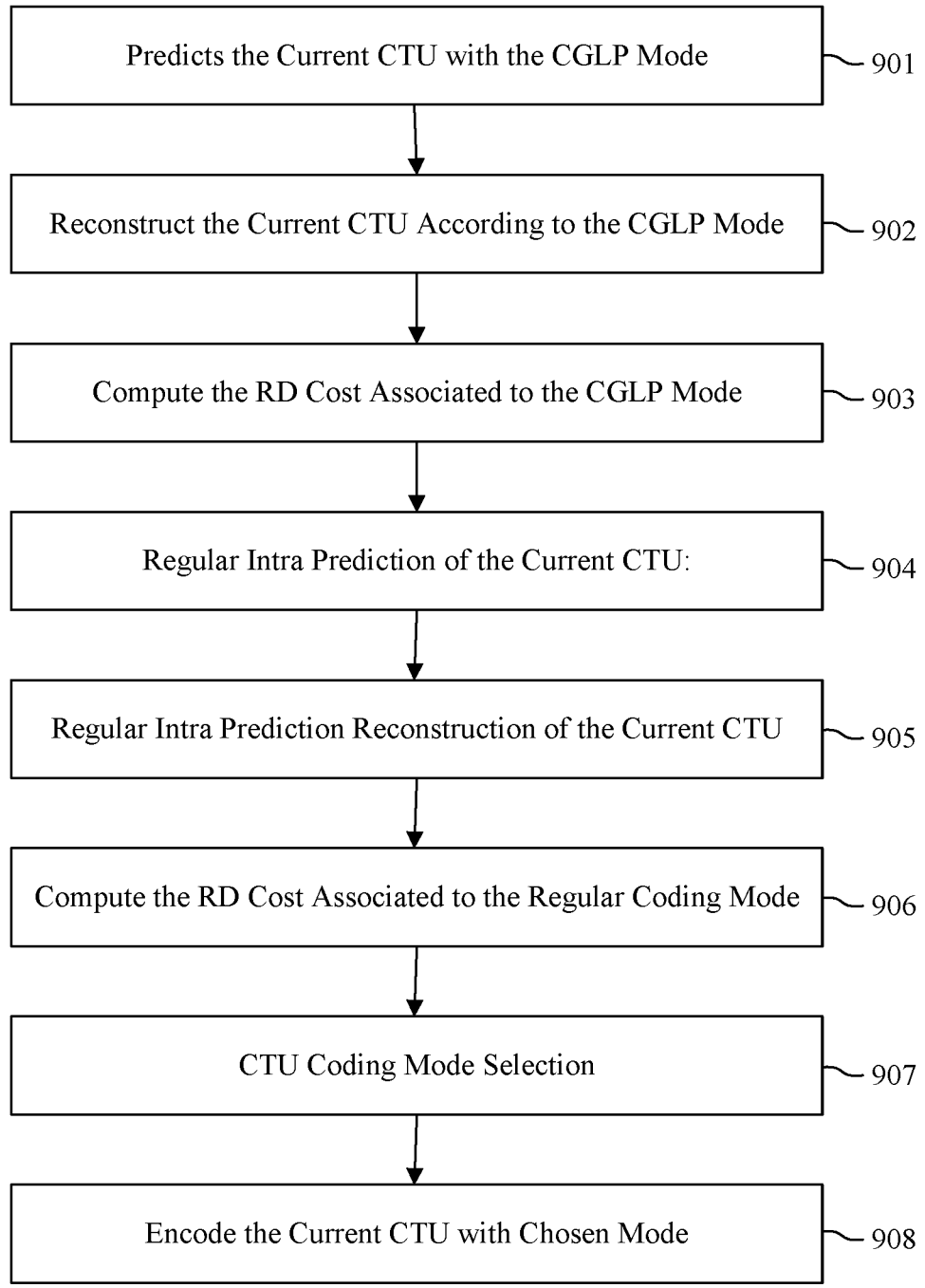
FIG. 9A depicts schematically an example of region level encoding process.

FIG. 9A depicts schematically an example of region level encoding process.

The process of FIG. 9A is executed by the processing module 500 when the processing module 500 implements an encoding module.

In the embodiment of FIG. 9A, this process is applied during the encoding of an intra picture into the encoded video stream 311 and the region is a CTU. The input of the process is therefore a current CTU to encode in the intra picture.

In a step 901, the processing module 500 predicts the current CTU using the CGLP mode applying the process of FIG. 8A.

In a step 902, the processing module 500 reconstructs the current CTU by applying the process of FIG. 8B.

In a step 903 the processing module 500 computes a rate distortion cost of the CGLP mode.

In a step 904, the processing module 500 applies a regular intra prediction to the current CTU as described in relation to FIG. 3.

In a step 905, the processing module 500 reconstructs the intra predicted current CTU applying a regular intra prediction reconstruction process as described in relation to FIG. 3 or 4.

In a step 906, the processing module 500 computes a rate distortion cost associated to the encoding of the CTU according to the regular intra prediction mode.

In a step 907, the processing module 500 selects the prediction mode minimizing the rate distortion cost between the regular intra prediction mode and the CGLP mode.

In a step 908, the processing module 500 encodes the current CTU according to the selected mode. If the CGLP mode is selected, step 908 comprises encoding in the encoded video stream 311
- a flag at the CTU level signaling a use of the CGLP mode,
- an information representative of a partitioning of the region in sub-regions and,
- applying a transform, a quantization and an entropy coding to the intra residual sub-regions to generate bitstream portions representative of the intra residual sub-regions.

In an embodiment of step 908, if the CGLP mode is selected, the processing module 500 encodes in the encoded video stream 311 at the CTU level an information representative of the region predictor. For example, the processing module 500 encodes an information representative of the prediction mode selected between the planar mode, the DC mode or the specific region predictor dedicated to the GCLP mode.

In an embodiment of step 908, in the CGLP mode, the prediction mode used for predicting a current CTU is fixed (i.e. the same prediction mode is always applied), encoded in a high level syntax element for instance in a sequence header (SPS) or a picture header (PPS), or implicit (i.e. the prediction mode used for predicting the region is inferred from other information of the encoded video stream 311). In that case, no information representative of the region predictor is needed to signal the region predictor at the CTU level.

In an embodiment, the process of FIG. 9A comprises a full encoding and a full decoding according to the CGLP and regular intra prediction modes.

In this embodiment, step 901 (respectively step 904) consists in a full encoding of the current CTU according to the CGLP mode (respectively according to the regular intra prediction mode). A full encoding according to the CGLP comprises applying a transform, a quantization and an entropy coding to the residual sub-regions obtained in step 804. A full encoding according to the regular intra prediction mode comprises applying a transform, a quantization and an entropy coding to the residual sub-regions obtained by applying an intra prediction to sub-regions obtained by partitioning the current CTU.

Step 902 (respectively step 905) consists in applying a full decoding of the CTU encoded according to the CGLP mode (respectively encoded according to the regular intra prediction mode). A full decoding according to the CGLP mode consists in applying in step 813 an entropy decoding, an inverse quantization and an inverse transform to each intra residual sub-region before adding the decoded intra residual sub-region to the intra predictor of said residual sub-region. Step 813 is then followed by step 814 to obtain the reconstructed region. A full decoding according to the regular intra prediction mode consists in applying an entropy decoding, an inverse quantization and an inverse transform to each residual sub-region and adding the reconstructed residual sub-region to the intra predictor of said sub-region. In that case, the reconstructed region is obtained directly as a combination of all reconstructed sub-regions.

Step 903 (respectively step 906) consists then in determining the number of bits used to encode according to the CGLP mode (respectively according to the regular intra prediction mode) and compute a distortion between the original CTU and the decoded CTU to compute the rate distortion cost of the CGLP mode (respectively of the regular intra prediction mode).

In a fast decision process, full encoding and decoding processes could be avoided by basing the decision on a distortion instead of a rate distortion cost.

Figure 9B:
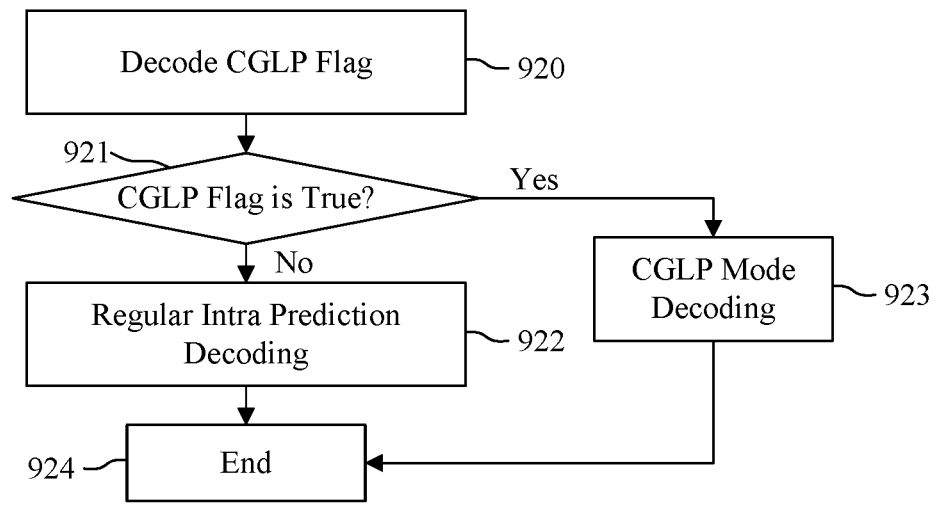
FIG. 9B depicts schematically an example of region level decoding process.
Figure 9C:
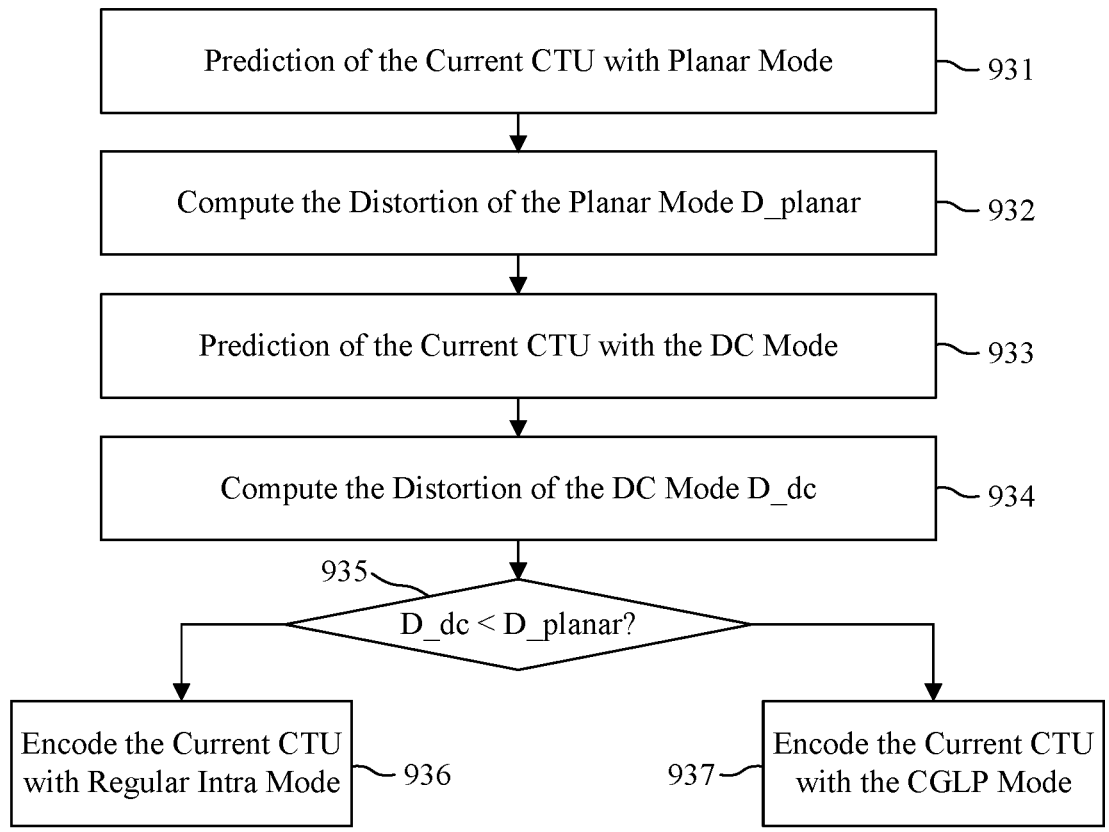
FIG. 9C depicts schematically an example of region level encoding process using a fast decision process.

FIG. 9C depicts schematically an example of region level encoding process using a fast decision process.

In a step 931, the processing module 500 predicts the current CTU using the planar mode.

In a step 932, the processing module 500 computes the distortion D_planar between the current CTU and the predictor obtained using the planar mode.

In a step 933, the processing module 500 predicts the current CTU using for example the DC mode.

In a step 934, the processing module 500 computes the distortion D_dc between the current CTU and the predictor obtained using the DC mode.

In a step 935, the processing module 500 compares the distortion D_dc to the distortion D_planar.

If the distortion D_dc is lower than the distortion D_planar, the processing module 500 fully encodes the current CTU according to the regular intra prediction mode in a step 936. Otherwise, the processing module 500 fully encodes the current CTU according to the CGLP mode in a step 937.

It is considered in the process of FIG. 9C that, if a basic mode such as the DC mode provides a lower distortion than the planar mode, then the regular intra prediction mode would provide a lower rate distortion cost that the CGLP mode.

FIG. 9B depicts schematically an example of region level decoding process.

The process of FIG. 9B is executed by the processing module 500 when the processing module 500 implements a decoding module.

In the embodiment of FIG. 9B, the process is applied during the decoding of an intra picture from the encoded video stream 311 and the region is a CTU. The input of the process is therefore a current CTU to decode in the intra picture.

In a step 920, the processing module 500 parses a syntax element that consists in a CTU-level flag signaling the use of the CGLP prediction mode.

In a step 921, the processing module 500 determines the value of the CGLP flag.

In case this flag is false, indicating the CGLP prediction mode was not used to encode the current CTU, step 921 is followed by a step 922.

During step 922, a regular decoding process is applied. Since, in the embodiment of FIG. 9B, the picture is an intra picture, the processing module 500 applies in step 922 a regular intra prediction reconstruction process as described in relation to FIGS. 3 and 4.

In case the CGLP flag is true, indicating the CGLP prediction mode was used to encode the current CTU, step 921 is followed by a step 923.

During step 923, the processing module 500 applies the process of FIG. 8B wherein during step 813, an entropy decoding, an inverse quantization and an inverse transform is applied to each intra residual sub-region to obtain the reconstructed residual region.

The process of FIG. 9B ends in a step 924.

In an embodiment, called illumination prediction-based embodiment, the region predictor is obtained using an illumination prediction mode.

In the illumination prediction-based embodiment, CTUs spatially neighboring the current CTU are used to capture illumination variations in the picture comprising the current region. Similar to the planar prediction, this illumination prediction is defined as an average of two linear predictions.

Figure 10:
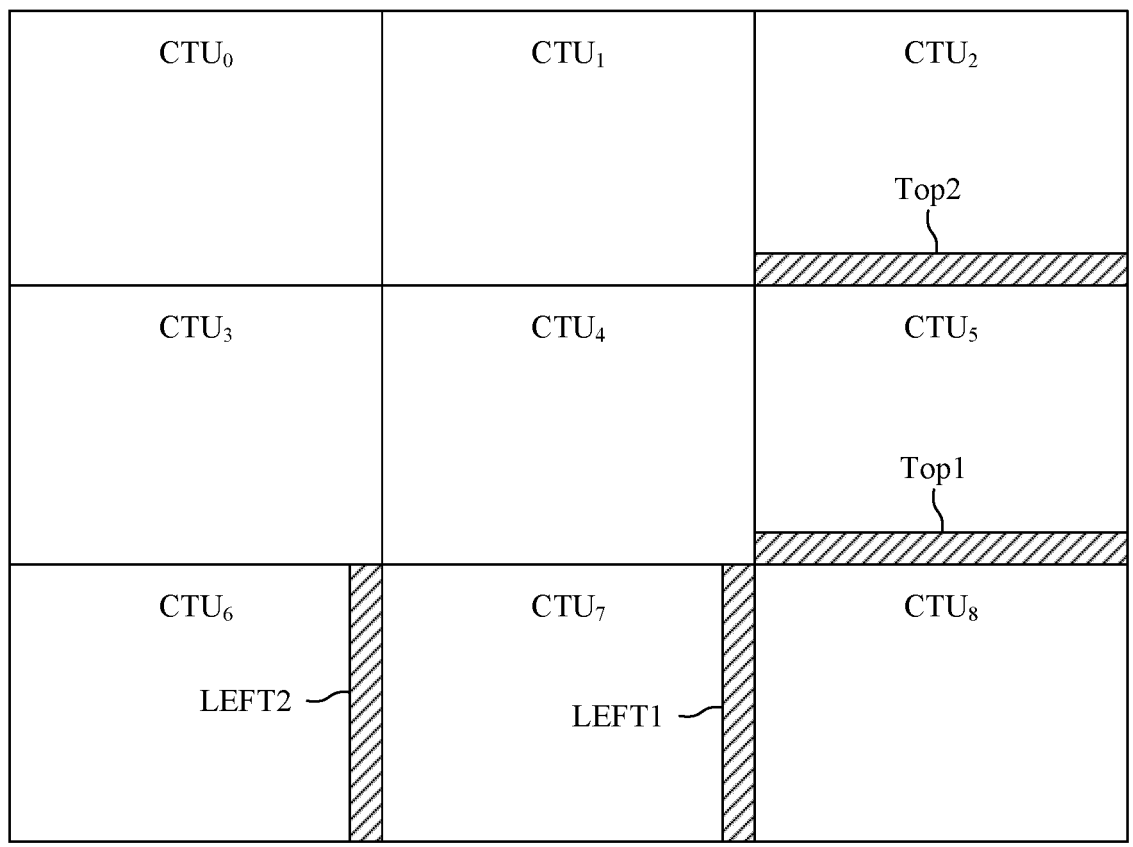
FIG. 10 illustrates schematically an illumination prediction based embodiment.

FIG. 10 illustrates schematically the illumination prediction based embodiment.

First, a vertical linear illumination prediction using top reference samples is constructed. The reconstructed samples of the first top neighboring line above the current CTU (line TOP1 in FIG. 10) and the reconstructed samples of the first top neighboring line above the first top reconstructed neighboring CTU (line TOP2 in FIG. 10) are used to calculate parameters called above illumination compensation parameters ($a_{CTU\_A}$, $b_{CTU\_A}$) with a linear regression method. The above illumination compensation parameters are then used to compute a vertical linear prediction $P_{x,y}^V$ as below:

$$P_{x,y}^V = a_{CTU\_A} \cdot R_{x,0} + b_{CTU\_A}$$

where $R_{x,0}$ represents samples in lines TOP1 and TOP2 in FIG. 10.

Second, an horizontal linear illumination prediction using left reference samples, is constructed in a similar way. The reconstructed samples of the first left neighboring line on the left of the current CTU (line LEFT1 in FIG. 10) and the reconstructed samples of the first left neighboring line of its first left reconstructed neighboring CTU (line LEFT2 in FIG. 10) are used to calculate parameters called left illumination compensation parameters ($a_{CTU\_L}$, $b_{CTU\_L}$) with a linear regression method. The left illumination compensation parameters are then used to compute an horizontal linear prediction $P_{x,y}^H$ as below:

$$P_{x,y}^H = a_{CTU\_L} \cdot R_{0,y} + b_{CTU\_L}$$

where $R_{0,y}$ represents samples in columns LEFT1 and LEFT2 in FIG. 10.

The final illumination prediction of the current CTU is equal to an average of the horizontal and vertical linear predictions, according to the following equation:

$$P_{x,y} = (P_{x,y}^V + P_{x,y}^H)/2$$

The final illumination prediction is used as the region predictor in the processes of FIGS. 8A and 8B.

In a variant of the illumination prediction based embodiment, other sets of reconstructed samples, different from the set of reconstructed samples corresponding to the lines TOP1, TOP2, LEFT1 and LEFT2 could be used. For example, sets of samples corresponding to a L shape around the current CTU could be used.

Until now, the region is mainly considered to be a CTU. In an embodiment, called embodiment with various spatial granularity levels for region prediction, other types of regions could be used.

In a first variant of the embodiment with various spatial granularity levels for region prediction, the region has a predefined fixed size, for instance the region is a block of size 64×64.

In a second variant of the embodiment with various spatial granularity levels for region prediction, regions could be defined as CU having a size larger than a predefined fixed size, like for example 64×64. This way, the region prediction may apply also on 128×64 or 64×128 or 64×64 CUs, depending on the partitioning chosen in a considered CTU.

In a third variant of the embodiment with various spatial granularity levels for region prediction, the region is determined in function of a depth value of a CU in a coding tree representation of a CTU. A depth value of a region in a CTU is number of successive partitioning to be applied to a CTU to obtain the region. In FIG. 2, the CU 241 is associated to a depth value equal to "2" since two partitioning were applied to the CTU to obtain the CU 241 (a first partitioning to divide the CTU in "4" square regions of equal sizes and a second partitioning to divide the top right region in "4" square regions of equal size). The CU 242 is associated to a depth value equal to "1". For example, a region is defined as a CU having a depth value lower than a given threshold in the coding tree representation of a considered CTU.

In an embodiment called embodiment with CU-level signalization, the use of the proposed CGLP mode is signaled at CU-level. This means the region prediction still happens in a large picture area, but its use in the coding/decoding of CUs is signaled at the CU level.

Figure 11A:
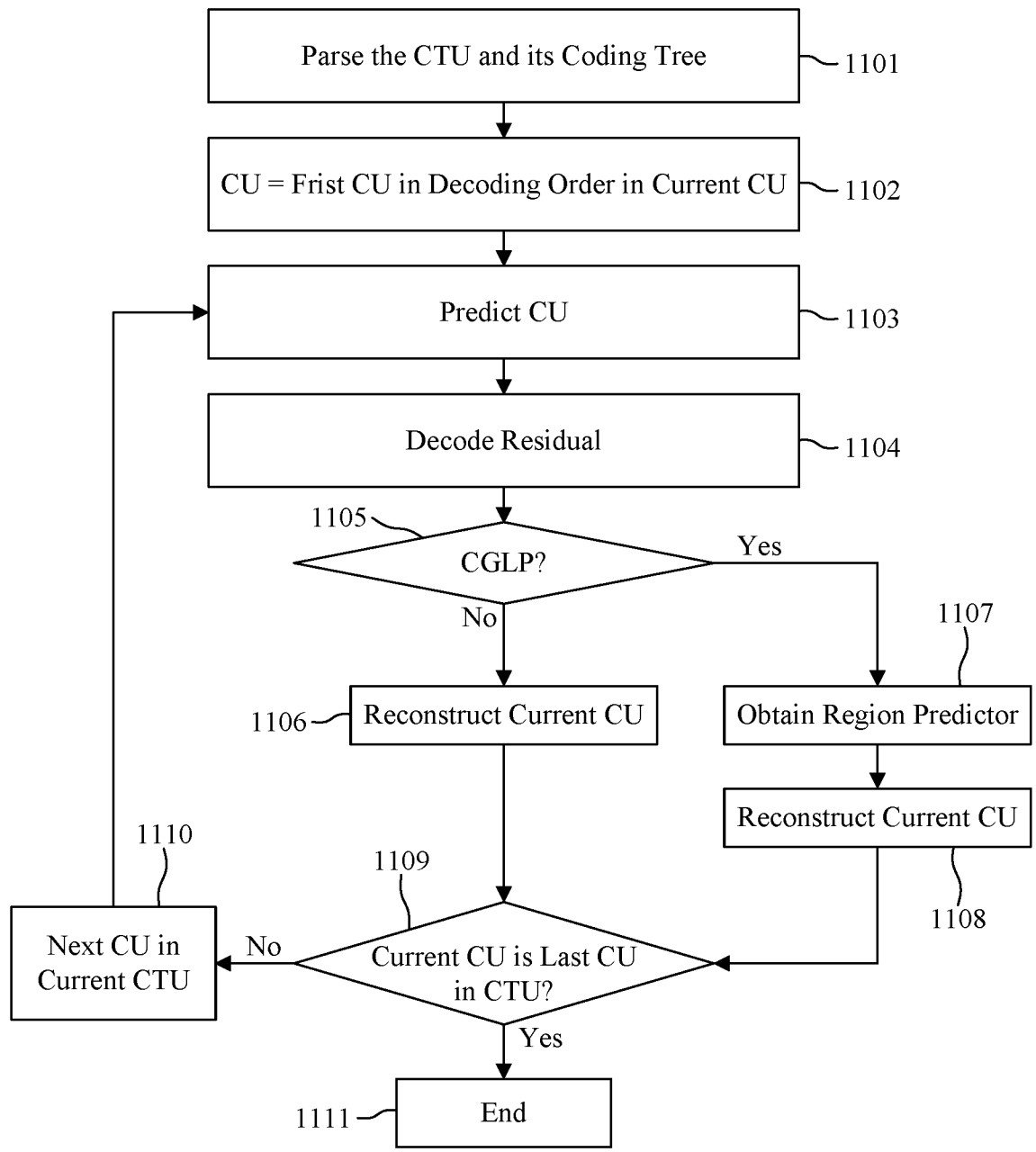
FIG. 11A illustrates an example of a decoding process applied to a CTU corresponding to an embodiment with CU-level signalization.

FIG. 11A illustrates an example of a decoding process applied to a CTU corresponding to the embodiment with CU-level signalization.

The decoding process of FIG. 11A is executed by the processing module 500 when the processing module 500 implements a decoding module.

The input to the decoding process is a current CTU to decode represented by a portion of the encoded video stream 311.

In a step 1101, the processing module 500 parses the portion of the encoded video stream 311 corresponding to the current CTU, which, in particular, allows obtaining a coding tree representation of the current CTU.

In a step 1102, the processing module 500 focuses on a current CU corresponding to the first CU of the current CTU in decoding order.

In a step 1103, the processing module 500 performs an intra prediction of the current CU using an intra prediction mode specified in the portion of the encoded video stream 311 and obtains an intra predictor pred(CU,IPM_local) for the current CU, where IPM_local represents the intra prediction mode of the current CU.

In a step 1104, the processing module 500 decodes an intra residual CU res(CU) for the current CU from the portion of the encoded video stream 311.

In a step 1105, the processing module 500 determines if the CGLP mode is used for the current CU. To do so, a flag indicating this use, and obtained during step 1101, is checked.

If the flag indicates that the CGLP mode is not used, step 1105 is followed by step 1106. In step 1106, the current CU is reconstructed by adding the intra residual CU res(CU) to the intra predictor pred(CU,IPM_local):

$$REC(CU)=\text{pred}(CU,IPM\_\text{local})+res(CU)$$

Where REC(CU) is the reconstructed current CU.

If the flag indicates that the CGLP mode is used, step 1105 is followed by a step 1107. In step 1107, the processing module 500 obtains a region predictor for the current CU. For example, the planar mode is used to obtain a region predictor $\text{reg\_pred}_{planar}(CU)$ for the current CU.

In a step 1108, the processing module 500 reconstructs the current CU by adding the intra residual CU res(CU) and the intra predictor pred(CU,IPM_local) to a portion of the region predictor $\text{reg\_pred}_{planar}(CU)$ corresponding spatially to the current CU:

$$REC(CU)=\text{pred}(CU,IPM\_\text{local})+res(CU)+\text{reg\_pred}_{planar}(CU)$$

Steps 1106 and 1108 are followed by step 1109 wherein the processing module 500 determines if the current CU is the last CU in decoding order of the current CTU. If yes, the processing module 500 stops the process of FIG. 11A in a step 1111. Otherwise, the processing module 500 identifies the next CU of the current CTU to decode in a step 1110 and continues with step 1103.

Figure 11B:
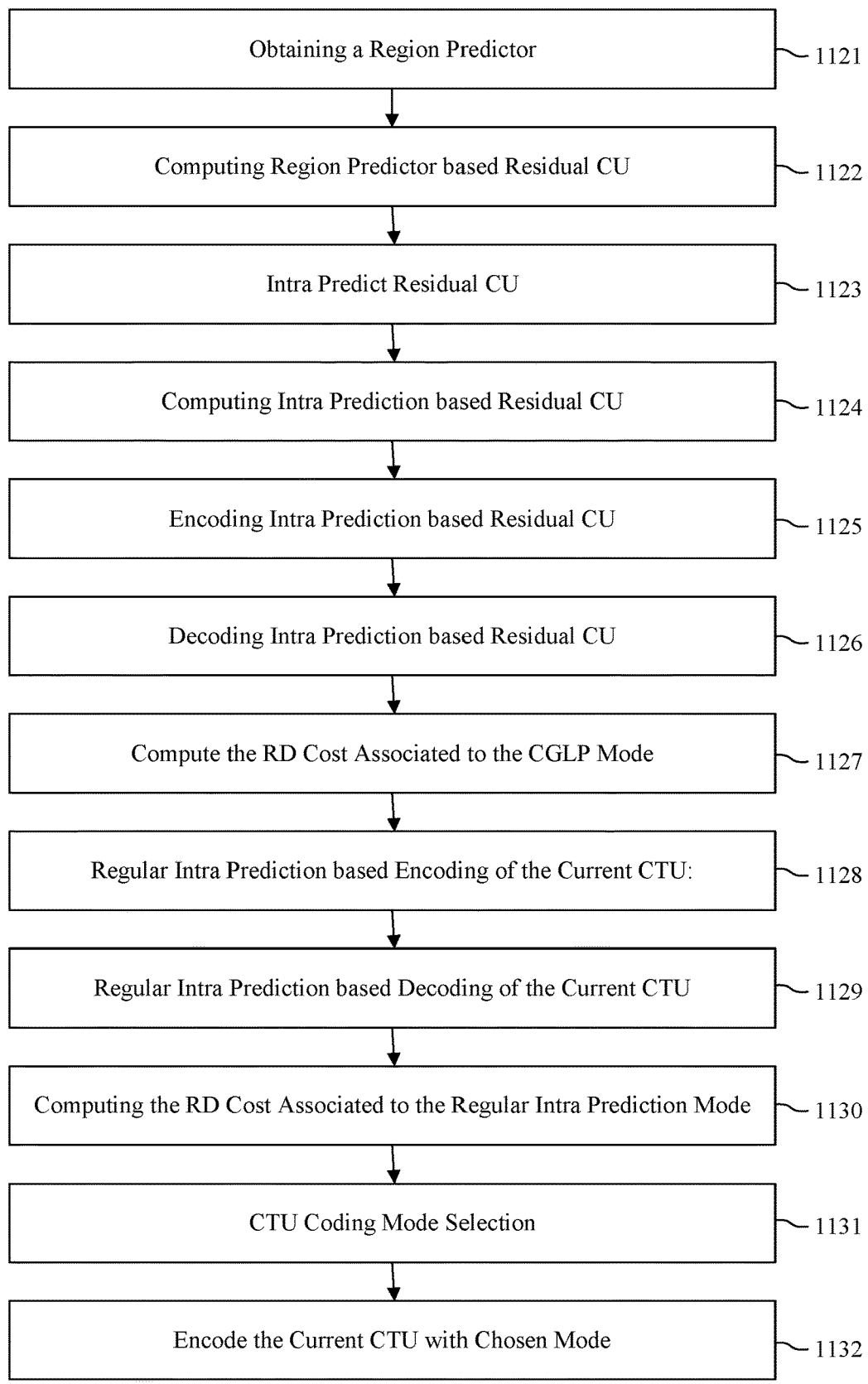
FIG. 11B illustrates an example of an encoding process applied to a CTU corresponding to the embodiment with CU-level signalization.

FIG. 11B illustrates an example of an encoding process applied to a CTU corresponding to the embodiment with CU-level signalization.

The encoding process of FIG. 11B is executed by the processing module 500 when the processing module 500 implements an encoding module. It is supposed here that the coding tree, i.e. the partitioning in CU, of the current CTU was determined before applying the process of FIG. 11B. Only one CU, called current CU, is processed in the encoding process of FIG. 11B. However, the same process is applied to all other CU of the current CTU.

In a step 1121, the processing module 500 obtains a region predictor for the current CTU.

In a step 1122, the processing module 500 computes a residual CU $RES(CU)^{Reg}$ for the current CU as a difference between the current CU and a spatially corresponding area in the region predictor.

In a step 1123, the processing module 500 obtains an intra predictor $PRED(CU)^{Intra}$ for the residual CU $RES(CU)^{Reg}$ using a regular intra prediction.

In a step 1124, the processing module 500 computes an intra prediction residual $RES(CU)^{Intra}$ for the residual CU $RES(CU)^{Reg}$ as a difference between the residual CU $RES(CU)^{Reg}$ and the intra predictor $PRED(CU)^{Intra}$.

In a step 1125, the processing module 500 encodes (i.e. transform, quantize and entropy encode) the intra prediction residual $RES(CU)^{Intra}$, which allow determining the rate cost $R_{CGLP}$ of the CGLP mode for the current CU.

In a step 1126, the processing module 500 decodes the intra prediction residual $RES(CU)^{Intra}$, which allow determining the distortion $D_{CGLP}$ of the CGLP mode for the current CU.

In a step 1127, the processing module 500 compute the rate distortion cost $RD_{CGLP}$ of the CGLP mode for the current CU using the rate cost $R_{CGLP}$ and the distortion $D_{CGLP}$.

In a step 1128, the processing module 500 encodes the current CU using a regular intra prediction.

In a step 1129, the processing module 500 decodes the current CU encoded in step 1128.

In a step 1130, the processing module 500 computes a rate distortion cost $RD_{Intra}$ of the regular intra prediction mode.

In a step 1131, the processing module 500 compares the two rate distortion costs and selects the prediction mode corresponding to the lowest rate distortion cost.

In a set 1132, the processing module 500 encodes the current CU using the selected prediction mode. If the CGLP mode is selected for the current CU, the processing module 500 encodes a flag specifying the use of the CGLP mode for the current CU in the portion of the encoded video stream 311 corresponding to the current CTU.

In an embodiment, called embodiment with modified planar mode, the region predictor is obtained by performing a modified planar prediction using a bottom-right sample value (noted B in FIG. 12) encoded in the encoded video stream.

Figure 12:
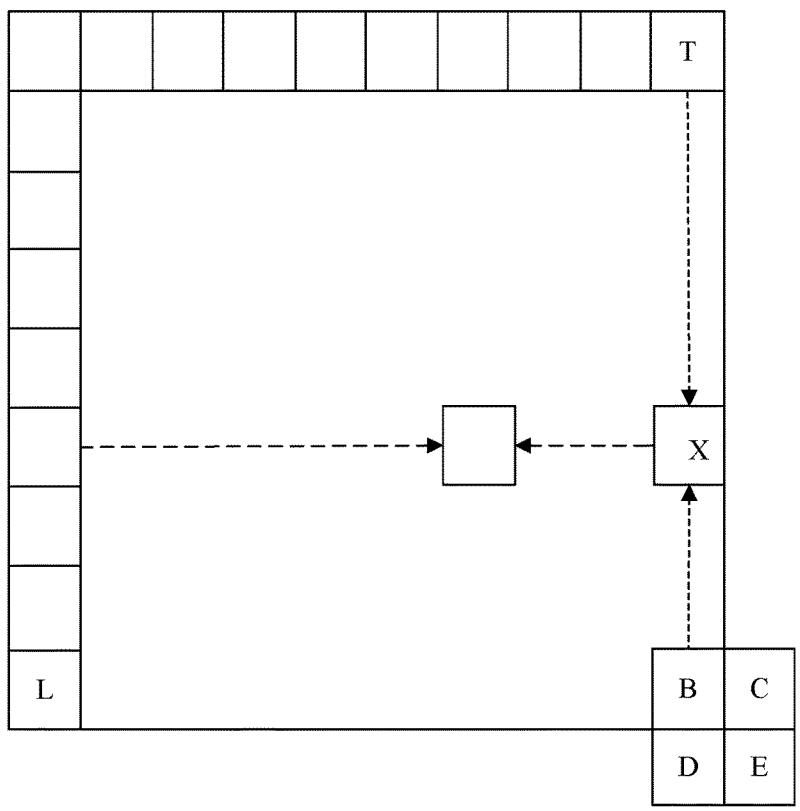
FIG. 12 depicts schematically a modified planar mode.
Figure 12:
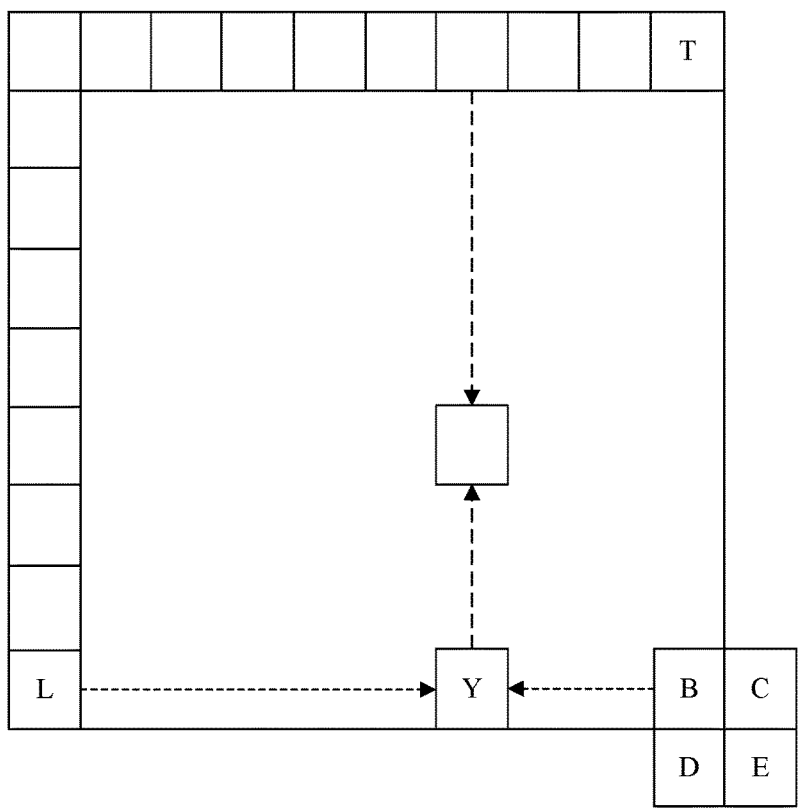

FIG. 12 depicts schematically the modified planar mode.

Similarly to the planar mode, the modified planar mode is essentially defined as an average of two linear predictions. A first, horizontal linear prediction (top of FIG. 12) consists in a weighted average between a left-side reference sample and a right-side reference sample value X, X being equal to a weighted average of the top-right reference sample T and the bottom right sample B. A second, vertical linear prediction, shown on the bottom of FIG. 12, is a weighted average between a top reference sample and a bottom reference sample value Y, Y being equal to a weighted average of the bottom left reference sample L and the bottom right reference sample B of the block. The final modified planar prediction of current block is equal to an average of the horizontal and vertical linear predictions.

In a variant of the embodiment with modified planar mode, the bottom right sample B is not fixed but selected between samples B, C, D and E on a rate distortion basis, the sample minimizing a rate distortion cost being selected. In order to determine the rate distortion cost associated with sample C (respectively D and E), sample C (respectively D and E) replaces sample B for the computation of the vertical and horizontal linear interpolation.

In a second variant of the embodiment with modified planar mode, the value bottom right sample B is explicitly encoded in the bitstream. This value may not be derived from samples T or L in FIG. 12 but could be a value optimizing a rate-distortion criterion determined by the processing module 500 of the encoding module.

In an embodiment, called embodiment with reshaping, the residual region undergoes a reshaping process on the encoder side and the reconstructed residual region undergoes an inverse reshaping process on the decoder side.

On the encoder side, a reshaping function is applied on the residual region between steps 802 and 803. The reshaping function could be fixed or determined by minimizing a cost value computed between the current CTU and the reshaped and then inverse reshaped CTU. As an example, this cost function may take the form of the Hadamard transform domain distortion known as the HAD in the field of video coding.

On the decoder side, a reshaping function is applied to the reconstructed residual region between steps 813 and 814.

Until now, it is considered that the CGLP mode applies to INTRA pictures. However, the CGLP mode could also be applied to INTER pictures. In an embodiment, called embodiment with temporal prediction, a final region predictor is obtained by combining a temporal predictor and region predictor as defined in steps 801 and 811.

Figure 13A:
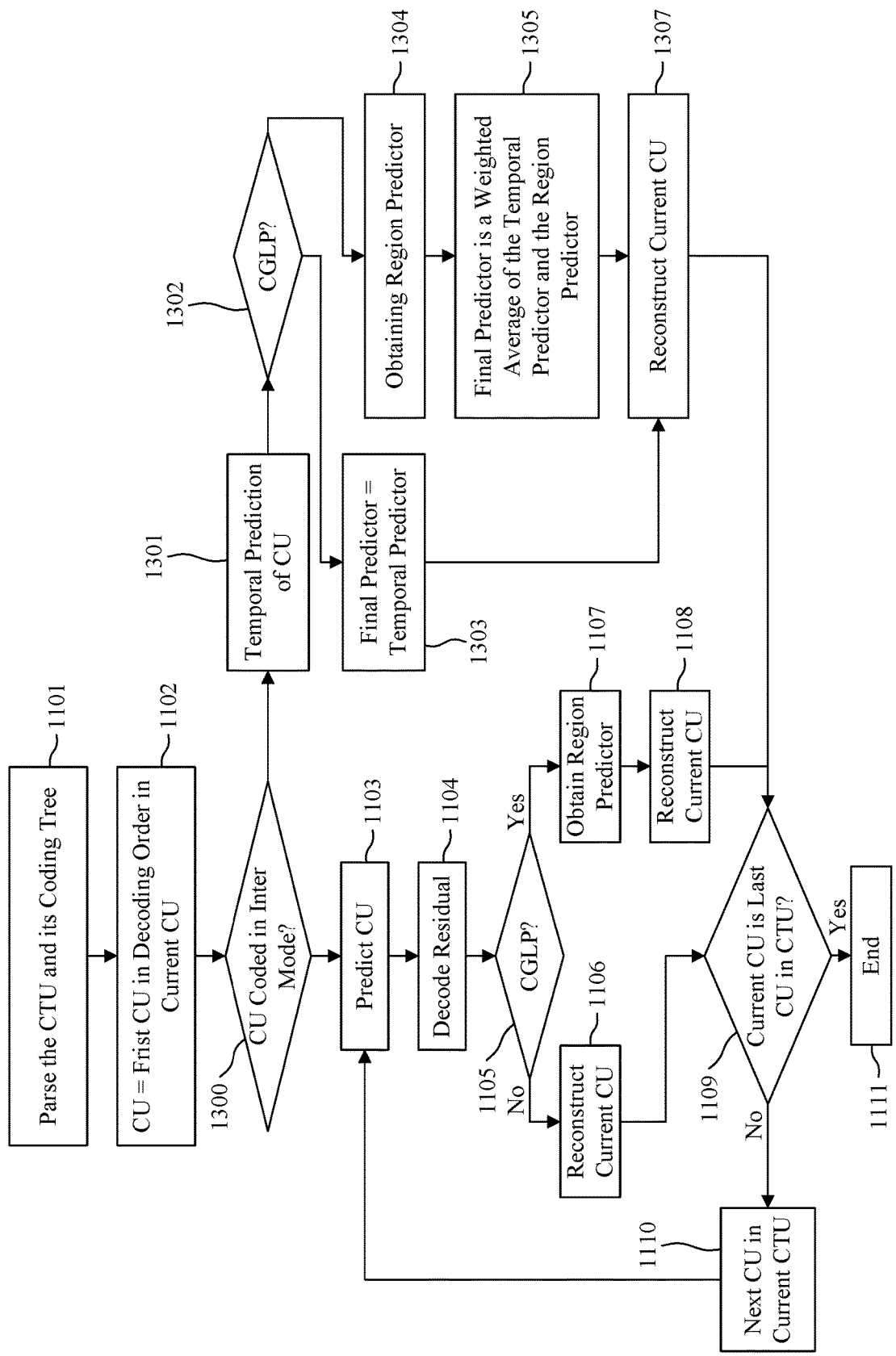
FIG. 13A depicts schematically an example of decoding process compliant with an embodiment with temporal prediction; and, FIG. 13B depicts schematically an example of encoding process compliant with the embodiment with temporal prediction.

FIG. 13A depicts schematically an example of decoding process compliant with the embodiment with temporal prediction.

The decoding process of FIG. 13A is executed by the processing module 500 when the processing module 500 implements a decoding module.

The input of the decoding process is a current CTU to decode represented by a portion of the encoded video stream 311. The current CTU is comprised in an inter picture.

The decoding process of FIG. 13A comprises the steps of FIG. 11A and new steps specific to the embodiment with temporal prediction.

The process of FIG. 13A starts with steps 1101 and 1102.

Step 1102 is followed a step 1300 during which the processing module 500 determines if the current CU is temporally predicted or not. If the current CU is not temporally predicted, step 1300 is followed by steps 1103 to 1111 already explained in relation to FIG. 11A.

If the current CU is temporally predicted, step 1300 is followed by steps 1301. In step 1301, a temporal predictor temp_pred(CU) is determined for the current CU. The temporal predictor temp_pred(CU) is determined using an information representative of an inter prediction mode applied to the current CU obtained from the encoded video stream 311.

In a step 1302, the processing module 500 determines if the CGLP mode was applied to the current CU.

If the current CU was not encoded using the CGLP mode, the processing module 500 determines in a step 1303 that the final predictor of the current CU is the temporal predictor temp_pred(CU) determined in step 1301. Step 1303 is followed by a step 1307 during which the final predictor is added to a residual CU decoded from the encoded video stream 311.

If the current CU was encoded using the CGLP mode, the processing module 500 obtains a region predictor for the current CU in a step 1304. For example, the planar mode is used to obtain a region predictor $reg\_pred_{planar}(CU)$ for the current CU.

In a step 1305, the processing module 500 computes a final predictor final_pred(CU) for the current CU as a weighted average of the temporal predictor temp_pred(CU) and the region predictor $reg\_pred_{planar}(CU)$:

$$final\_pred(CU) = W1 \cdot temp\_pred(CU) + W2 \cdot reg\_pred_{planar}(CU)$$

Where W1 and W2 are weights for example equals to "½" or signaled in the encoded video stream 311.

In that case, in step 1307, the processing module 500 applies steps 812 and 813 to reconstruct the residual intra sub-region corresponding to the current CU and step 814 consists in adding the reconstructed intra residual sub-region to the final predictor final_pred(CU).

Step 1307 is followed by step 1109 already described in relation to FIG. 11A.

Figure 13B:
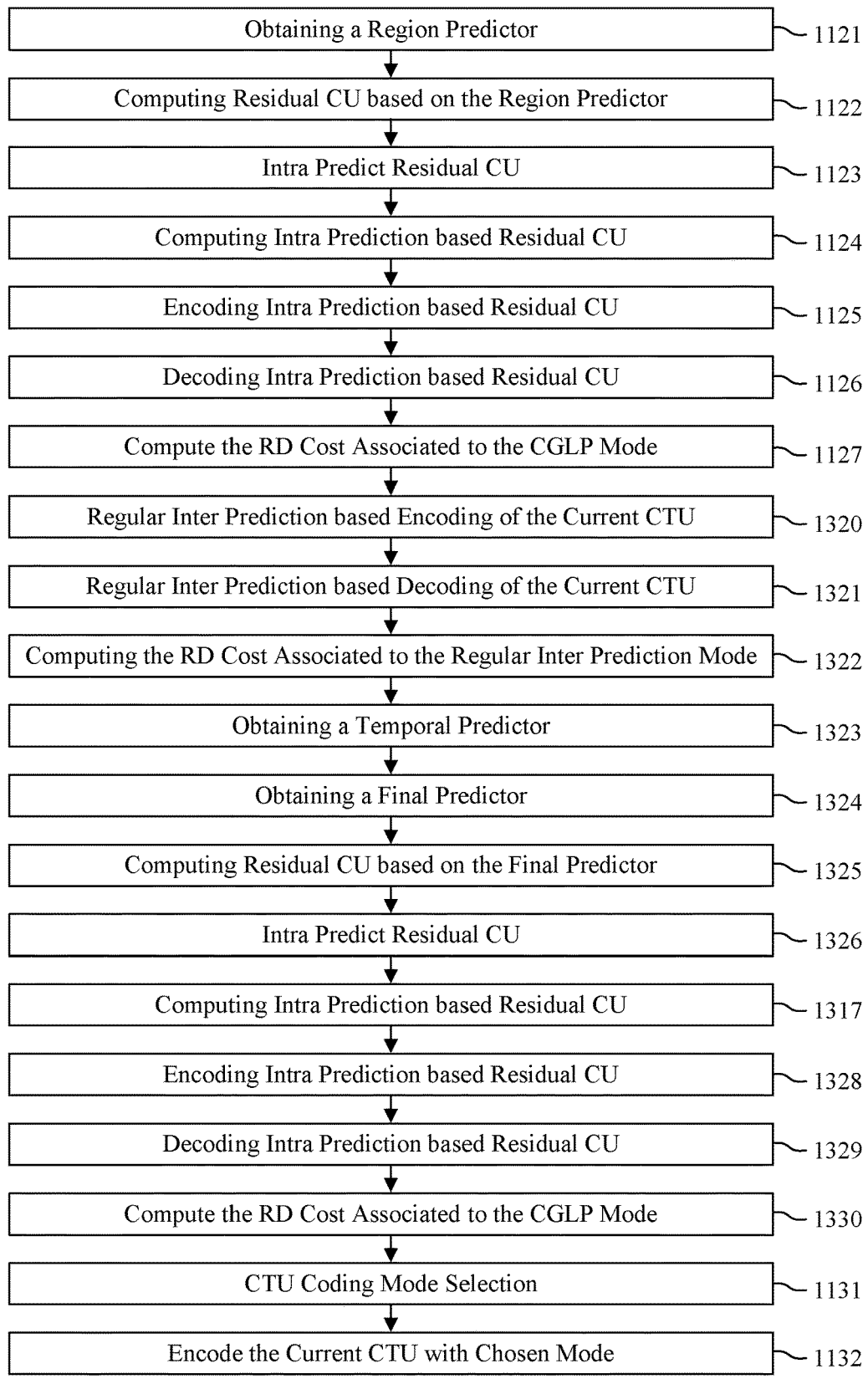

FIG. 13B depicts schematically an example of encoding process compliant with the embodiment with temporal prediction.

The encoding process of FIG. 13B is executed by the processing module 500 when the processing module 500 implements a encoding module.

The encoding process of FIG. 13B comprises steps of FIG. 11B and new steps specific to the embodiment with temporal prediction.

The processing module 500 starts by executing steps 1121 to 1127 to compute a rate distortion cost of the CGLP mode.

Step 1127 is followed by a step 1320. In the step 1320, the processing module 500 encodes the current CU using a regular inter prediction. During this step, a best inter prediction mode is determined in a plurality of inter prediction modes and applied to the current CU.

In a step 1321, the processing module 500 decodes the current CU encoded in step 1320.

In a step 1322, the processing module 500 computes a rate distortion cost $RD_{Inter}$ of the regular inter prediction mode.

In a step 1323, the processing module 500 obtains a temporal predictor for the current CU. For example, the temporal predictor is obtained using the best inter prediction mode selected in step 1320.

In a step 1324, the processing module 500 obtains a final predictor final_pred(CU) for the current CU as a weighted average of the temporal predictor temp_pred(CU) and the region predictor reg_pred$_{planar}$(CU):

$$final\_pred(CU)=W1 \cdot temp\_pred(CU)+ W2 \cdot reg\_pred_{planar}(CU)$$

In a step 1325, the processing module 500 computes a residual CU as a difference between the current CU and the final predictor final_pred(CU).

In a step 1326, the processing module 500 determines an intra predictor for the residual CU.

In a step 1327, the processing module 500 determines an intra residual CU as the difference between the residual CU computed in step 1325 and the intra predictor.

In a step 1328, the processing module 500 applies a transform, a quantization and an entropy coding to the intra residual CU to encode the intra residual CU.

In a step 1329, the processing module 500 applies an entropy decoding, an inverse quantization and an inverse transform to the encoded intra residual CU.

In a step 1330, the processing module 500 reconstructs the current CU using the decoded intra residual CU, the intra predictor of the CU and the final predictor to compute a rate distortion cost of the CGLP mode with temporal prediction.

Step 1330 is followed by steps 1131 and 1132 during which the processing module 500 selects the mode between the CGLP mode, the regular inter prediction mode and the CGLP mode with temporal prediction based on the rate distortion costs and encodes the current CU according to the selected mode.

We described above a number of embodiments. Features of these embodiments can be provided alone or in any combination. Further, embodiments can include one or more of the following features, devices, or aspects, alone or in any combination, across various claim categories and types:

- A bitstream or signal that includes one or more of the described syntax elements (i.e. flags), or variations thereof.
- Creating and/or transmitting and/or receiving and/or decoding a bitstream or signal that includes one or more of the described syntax elements, or variations thereof.
- A TV, set-top box, cell phone, tablet, or other electronic device that performs at least one of the embodiments described.
- A TV, set-top box, cell phone, tablet, or other electronic device that performs at least one of the embodiments described, and that displays (e.g. using a monitor, screen, or other type of display) a resulting image.
- A TV, set-top box, cell phone, tablet, or other electronic device that tunes (e.g. using a tuner) a channel to receive a signal including an encoded video stream, and performs at least one of the embodiments described.
- A TV, set-top box, cell phone, tablet, or other electronic device that receives (e.g. using an antenna) a signal over the air that includes an encoded video stream, and performs at least one of the embodiments described.

The invention claimed is:

1. A method for decoding comprising:
obtaining a region predictor for a current region of a picture based on a spatial prediction;
obtaining an information representative of a partitioning of the current region into a plurality of sub-regions of samples;
for at least one sub-region of samples of the plurality, reconstructing a sub-region of residual values based on an intra prediction residual and an intra prediction mode signaled in video data for the sub-region of residual values, wherein values of reference samples external to the current region used for reconstructing a sub-region of residual values are modified before reconstructing the sub-region of residual values, and each intra predicted sub-region of residual values of the plurality is associated to an intra prediction mode independent of intra prediction modes associated to other intra predicted sub-regions of residual values of the plurality;
obtaining a reconstructed residual region from the at least one reconstructed sub-region of residual values; and
reconstructing the current region based on the reconstructed residual region and on the region predictor by combining a final predictor based on the region predictor and the reconstructed residual region.

2. The method according to claim 1 wherein obtaining the region predictor comprises obtaining the region predictor from a plurality of linear predictions, each linear prediction being based on parameters representative of illumination variations in the picture obtained from at least one region of the picture spatially neighboring the current region.

3. The method according to claim 1 wherein obtaining the region predictor comprises obtaining the region predictor based on a combination of a horizontal linear prediction and a vertical linear prediction, each linear prediction using samples of reconstructed regions neighboring the current region and at least one sample belonging to a non-reconstructed region.

4. The method according to claim 3 wherein the sample belonging to a non-reconstructed region is a bottom right sample of the current region in the current region or out of the current region.

5. The method according to claim 1 comprising obtaining a temporal predictor for the current region and wherein the final predictor is a weighted average of the region predictor and the temporal predictor.

6. The method according to claim 1 wherein the reconstructed residual region undergoes an inverse reshaping process before being used for reconstructing the current region.

7. The method according to claim 1 wherein values of all reference samples external to the current region used for reconstructing a sub-region of residual values are set to zero before reconstructing the at least one residual sub-region of residual values.

8. Non-transitory information storage medium storing program code instructions for implementing the method according to claim 1.

9. A method for encoding comprising:
obtaining a region predictor for a current region of a picture based on a spatial prediction;
obtaining a residual region for the current region by subtracting a final predictor obtained from the region predictor from the current region;
partitioning the residual region into a plurality of sub-regions of residual values; and
for at least one sub-region of residual values of the plurality, intra predicting the sub-region of residual values, the intra predicting comprising:
determining an intra prediction mode for the sub-region of residual values;
determining an intra predictor for the sub-region of residual values based on the determined intra prediction mode; and
determining an intra residual for the sub-region of residual values as the difference between the sub-region of residual values and the intra predictor; and signaling the intra prediction mode and the intra residual in video data, wherein values of reference samples external to the current region used for intra predicting at least one sub-region of residual values of the plurality are modified before intra predicting the sub-region of residual values and, each intra predicted sub-region of residual values of the plurality is associated to an intra prediction mode independent of intra prediction modes associated to other intra predicted sub-regions of residual values of the plurality.

10. The method according to claim 9 wherein obtaining the region predictor comprises obtaining the region predictor from a plurality of linear predictions, each linear prediction being based on parameters representative of illumination variations in the picture obtained from at least one region of the picture spatially neighboring the current region.

11. The method according to claim 9 wherein obtaining the region predictor comprises obtaining the region predictor based on a combination of a horizontal linear prediction and a vertical linear prediction, each linear prediction using samples of reconstructed regions neighboring the current region and at least one sample belonging to a non-reconstructed region.

12. The method according to claim 11 wherein the sample belonging to a non-reconstructed region is a bottom right sample of the current region in the current region or out of the current region.

13. The method according to claim 9 comprising obtaining a temporal predictor for the current region and wherein the final predictor is a weighted average of the region predictor and the temporal predictor.

14. The method according to claim 9 wherein the residual region undergoes a reshaping process before intra prediction of a sub-region of residual values.

15. The method according to claim 9 wherein values of all reference samples external to the current region used for intra predicting at least one sample of the residual region are set to zero before intra predicting a residual sub-region of residual values.

16. Non-transitory information storage medium storing program code instructions for implementing the method according to claim 9.

17. A device comprising electronic circuitry configured for:
obtaining a region predictor for a current region of a picture based on a spatial prediction;
obtaining an information representative of a partitioning of the current region into a plurality of sub-regions of samples;
for at least one sub-region of samples of the plurality, reconstructing (813) a sub-region of residual values based on an intra prediction residual and an intra prediction mode signaled in video data for the sub-region of residual values, wherein values of reference samples external to the current region used for reconstructing a sub-region of residual values are modified before reconstructing the sub-region of residual values and, each intra predicted sub-region of residual values of the plurality is associated to an intra prediction mode independent of intra prediction modes associated to other intra predicted sub-regions of residual values of the plurality;

obtaining a reconstructed residual region from the at least one reconstructed sub-region of residual values; and reconstructing the current region based on the reconstructed residual region and on the region predictor by combining a final predictor based on the region predictor and the reconstructed residual region.

18. The device according to claim 17 wherein the electronic circuitry being configured for obtaining the region predictor comprises the electronic circuitry being configured for obtaining the region predictor from a plurality of linear predictions, each linear prediction being based on parameters representative of illumination variations in the picture obtained from at least one region of the picture spatially neighboring the current region.

19. A device comprising electronic circuitry configured for:
obtaining a region predictor for a current region of a picture based on a spatial prediction;
obtaining a residual region for the current region by subtracting a final predictor obtained from the region predictor from the current region;
partitioning the residual region into a plurality of sub-regions of residual values; and
for at least one sub-region of residual values of the plurality, intra predicting the sub-region of residual values, the intra predicting comprising:
determining an intra prediction mode for the sub-region of residual values;
determining an intra predictor for the sub-region of residual values based on the determined intra prediction mode;
determining an intra residual for the sub-region of residual values as the difference between the sub-region of residual values and the intra predictor; and signaling the intra prediction mode and the intra residual in video data,
wherein values of reference samples external to the current region used for intra predicting at least one sub-region of residual values of the plurality are modified before intra predicting the sub-region of residual values and, each intra predicted sub-region of residual values of the plurality is associated to an intra prediction mode independent of intra prediction modes associated to other intra predicted sub-regions of residual values of the plurality.

20. The device according to claim 19 wherein the electronic circuitry being configured for obtaining the region predictor comprises the electronic circuitry being configured for obtaining the region predictor from a plurality of linear predictions, each linear prediction being based on parameters representative of illumination variations in the picture obtained from at least one region of the picture spatially neighboring the current region.

* * * * *